(12) United States Patent
McKim, Jr. et al.

(10) Patent No.: US 8,037,327 B2
(45) Date of Patent: Oct. 11, 2011

(54) SYSTEM AND METHOD FOR IMPROVING DYNAMIC RESPONSE IN A POWER SUPPLY

(75) Inventors: James B. McKim, Jr., Blairstown, NJ (US); Buck H. Chan, Budd Lake, NJ (US); Benjamin R. Jansyn, Rockaway, NJ (US)

(73) Assignee: Agilent Technologies, Inc., Santa Clara, CA (US)

( * ) Notice: Subject to any disclaimer, the term of this patent is extended or adjusted under 35 U.S.C. 154(b) by 567 days.

(21) Appl. No.: 12/241,374

(22) Filed: Sep. 30, 2008

(65) Prior Publication Data

US 2009/0248216 A1     Oct. 1, 2009

Related U.S. Application Data

(60) Provisional application No. 61/040,782, filed on Mar. 31, 2008.

(51) Int. Cl.
   *G06F 1/00*       (2006.01)
   *G01R 31/26*     (2006.01)

(52) U.S. Cl. .................................. 713/310; 324/761.01

(58) Field of Classification Search .................. 713/300, 713/310; 250/203.4, 214 R; 324/761.01
See application file for complete search history.

(56) References Cited

U.S. PATENT DOCUMENTS

| | | | |
|---|---|---|---|
| 4,528,503 A * | 7/1985 | Cole | 324/761.01 |
| 5,321,597 A | 6/1994 | Alacoque | |
| 5,503,026 A | 4/1996 | Bohm et al. | |
| 5,640,521 A | 6/1997 | Whetsel | |
| 6,037,857 A | 3/2000 | Behrens et al. | |
| 6,154,683 A | 11/2000 | Kessler et al. | |
| 6,457,152 B1 | 9/2002 | Paley et al. | |
| 6,467,003 B1 | 10/2002 | Doerenberg et al. | |
| 6,639,421 B1 * | 10/2003 | Yoshino et al. | 324/761.01 |
| 6,876,187 B2 * | 4/2005 | Matsuyama | 324/96 |
| 7,302,282 B2 | 11/2007 | McKim et al. | |
| 7,696,461 B2 * | 4/2010 | Sinton et al. | 250/203.4 |
| 7,709,727 B2 * | 5/2010 | Roehrig et al. | 136/243 |
| 2005/0051209 A1 * | 3/2005 | Choe | 136/293 |
| 2008/0163000 A1 | 7/2008 | McKim et al. | |
| 2008/0238195 A1 * | 10/2008 | Shaver et al. | 307/18 |
| 2008/0246463 A1 * | 10/2008 | Sinton et al. | 324/157 |
| 2009/0133735 A1 * | 5/2009 | Yuguchi et al. | 136/244 |
| 2009/0283129 A1 * | 11/2009 | Foss | 136/244 |
| 2010/0052425 A1 * | 3/2010 | Moore et al. | 307/52 |
| 2011/0084553 A1 * | 4/2011 | Adest et al. | 307/63 |

OTHER PUBLICATIONS

A Microprocessor-Based Solar Cell Test System, Schultz et al., IEEE Transactions on Instrumentation and Measurement, vol. IM-26, No. 4, Dec. 1977.*

Solar Array Simulator (SAS), Z2094B Capacity Review, Agilent Technologies, Aug. 31, 2009.*

* cited by examiner

*Primary Examiner* — Khanh Dang

(57) ABSTRACT

A system for improving dynamic response in a power supply includes a mainframe module having a memory and a mainframe microprocessor, the mainframe processor configured to calculate a plurality of tables in which each table represents a current/voltage (I/V) characteristic curve for the power supply, at least two power supply modules coupled to the mainframe module, each power supply module having a random access memory element, the random access memory element configured to receive and store a first table and a second table, wherein the mainframe microprocessor transfers the first table to each power supply module, and wherein each power supply module executes a respective first table while the mainframe processor calculates the second table for each power supply module and while the mainframe processor transfers the second table to each power supply module.

21 Claims, 11 Drawing Sheets

800

| ADDRESS | CURRENT | VOLTAGE |
|---|---|---|
| 3918 | 7.654 | 60.22 |
| 3919 | 7.656 | 60.22 |
| 3920 | 7.658 | 60.21 |
| 3921 | 7.660 | 60.20 |
| 3922 | 7.662 | 60.19 |
| 3923 | 7.664 | 60.19 |
| 3924 | 7.666 | 60.18 |
| 3925 | 7.668 | 60.17 |
| 3926 | 7.670 | 60.16 |
| 3927 | 7.672 | 60.15 |
| 3928 | 7.674 | 60.14 |
| 3929 | 7.676 | 60.14 |
| 3930 | 7.678 | 60.13 |
| 3931 | 7.680 | 60.12 |
| 3932 | 7.682 | 60.11 |
| 3933 | 7.684 | 60.10 |
| 3934 | 7.685 | 60.09 |
| 3935 | 7.687 | 60.08 |
| 3936 | 7.689 | 60.07 |
| 3937 | 7.691 | 60.05 |
| 3938 | 7.693 | 60.04 |
| 3939 | 7.695 | 60.03 |
| 3940 | 7.697 | 60.02 |
| 3941 | 7.699 | 60.01 |
| 3942 | 7.701 | 59.99 |
| 3943 | 7.703 | 59.98 |
| 3944 | 7.705 | 59.97 |
| 3945 | 7.707 | 59.95 |
| 3946 | 7.709 | 59.94 |
| 3947 | 7.711 | 59.92 |
| 3948 | 7.713 | 59.91 |
| 3949 | 7.715 | 59.89 |
| 3950 | 7.717 | 59.87 |
| 3951 | 7.719 | 59.86 |
| 3952 | 7.721 | 59.84 |
| 3953 | 7.723 | 59.82 |
| 3954 | 7.725 | 59.80 |
| 3955 | 7.726 | 59.79 |
| 3956 | 7.728 | 59.77 |
| 3957 | 7.730 | 59.75 |
| 3958 | 7.732 | 59.73 |
| 3959 | 7.734 | 59.70 |
| 3960 | 7.736 | 59.68 |
| 3961 | 7.738 | 59.66 |
| 3962 | 7.740 | 59.64 |
| 3963 | 7.742 | 59.61 |
| 3964 | 7.744 | 59.59 |
| 3965 | 7.746 | 59.56 |
| 3966 | 7.748 | 59.54 |
| 3967 | 7.750 | 59.51 |
| 3968 | 7.752 | 59.48 |
| 3969 | 7.754 | 59.45 |
| 3970 | 7.756 | 59.42 |

FIG. 8

SYSTEM AND METHOD FOR IMPROVING DYNAMIC RESPONSE IN A POWER SUPPLY

CROSS-REFERENCE TO RELATED APPLICATION

This application claims the benefit of the filing date of U.S. Provisional Application No. 61/040,782, entitled "Systems And Methods For Improving Performance Of A Solar Array Simulator (SAS)," filed on Mar. 31, 2008, and which is incorporated herein by reference.

BACKGROUND

Many different types of power supplies are available. One type of power supply is referred to as a direct current (DC) power supply because it generally provides an output in the form of a current that is directly related to a DC voltage. One particular type of DC power supply is used to emulate the performance of a solar array. Such a power supply is sometimes referred to as a solar array simulator (SAS).

A solar array simulator is a specialized DC power supply that acts to simulate the static current/voltage (I/V) characteristics of silicon or gallium arsenide solar panels or arrays of solar panels. The arrays being simulated are generally, although not exclusively, of the type used in spacecraft such as communications satellites. To the extent possible, these power supplies also attempt to simulate dynamic behavior. Dynamic behavior is exhibited in two distinct dimensions. The first of these relates to the dynamic response of the solar array to changing load conditions. The second relates to the solar array's dynamic response to changing illumination which typically occurs in response to eclipse events or as the array's orientation towards the sun varies.

The I/V characteristics of a solar array may be simulated by means of one of several available mathematical models. One such model is known by those skilled in the art as the exponential model. The exponential model describes the array output voltage as a function of load current. A numerical algorithm derived from this model may be used to define a voltage-input, current-output basis for simulation, i.e., operation as a current source. In purely static or low-bandwidth dynamic implementations, voltage supplied to the load is measured and used in a numerical algorithm to extract a controlled current value corresponding to the array's ability to source current at the measured voltage value. The power supply is operated as a constant current (CC) source and is programmed to the extracted value thus simulating the I/V characteristic of the solar array. Within resolution limits defined by the algorithm and the hardware implementation, each measured voltage value has a corresponding unique current value. A number of these ordered pairs may be used to define a current versus voltage curve which characterizes the particular array's characteristic for a given illumination. Changes in the array's design or configuration, changes to the semiconductor properties of silicon or gallium arsenide cells used in the array, changes in the connections between the individual cells making up the array, and changes in illumination or temperature are amongst a variety of factors that change the I/V characteristic curve.

Bandwidth in the two dimensions of dynamic behavior noted above may be improved in the first case by increasing the speed with which table entries may be retrieved in response to changing load voltage and in the second case by pre-calculating sets of ordered I/V pairs and assembling these into look-up tables which may be rapidly switched in response to changes in illumination. Both may be thought of as improvements in bandwidth.

With regard to the dynamic response of the solar array to changing load conditions, bandwidth may be improved by increasing the speed with which table entries are applied in response to changing load voltage. This can be accomplished by, for example, increasing the speed with which table entries are searched in response to changing load conditions.

With regard to the solar array's dynamic response to changing illumination, it is desirable to accurately simulate transitions into and out of an eclipse because the eclipse causes changes in illumination, which will in turn change the I/V characteristic of the solar array. This gives rise to a desire to have the ability to rapidly switch tables. Some satellites are configured to keep the solar arrays pointed towards the sun at all times. For these, eclipse occurs when the satellite enters the Earth's shadow. The speed with which eclipse occurs along with the perceived need to accurately simulate transitional conditions determines table update rates. Other satellites are configured to operate while spinning. With these, eclipse occurs repetitively as the satellite spins and may exhibit periods as short as three seconds or less. Under these conditions, table update rates may be quite high particularly if there is a desire to accurately simulate transitional conditions between full illumination and total eclipse.

An additional factor to be considered for simulations of complex solar arrays on high-power satellites involves solar arrays having numerous panels. These complex arrays typically comprise numerous individual panels which may have varying orientations with respect to the sun, particularly in the case where the satellite is designed to spin. For such configurations, a system of fifty or more separate SAS "channels" may be required, each of which should be capable of rapidly switching tables in tight synchronization. Moreover, if a high accuracy simulation of transitional conditions is desired, it may be necessary to rapidly cycle through a large number of tables on each channel. Because of the varying orientation of individual panels, each channel may have a similar or identical set of tables, but also a different "phase" relationship with respect to the satellite and its source of illumination. A typical scenario might involve 72 channels with 36 tables each (corresponding to 10 degree rotational resolution) and a spin period of 10 seconds. A system designed to support this application would need to provide table changes at an aggregate rate of ~260 tables per second. Assuming also that each table consists of 4096 entries (a typical value), the aggregate data rate is in excess of one million entries per second. The equations and numerical methods used for defining I/V relationships are such that real-time calculation of table entries at this rate entails an extreme computational load.

Therefore, it would be desirable to simulate dynamic behavior as it relates to the dynamic response of the solar array to changing load conditions and as it relates to the response of the solar array to changing illumination.

SUMMARY

In accordance with an embodiment, a system for improving dynamic response in a power supply comprises a mainframe module having a memory and a mainframe microprocessor, the mainframe processor configured to calculate a plurality of tables in which each table represents a current/voltage (I/V) characteristic curve for the power supply, at least two power supply modules coupled to the mainframe module, each power supply module having a random access memory element, the random access memory element configured to receive and store a first table and a second table, wherein the mainframe microprocessor transfers the first table to each power supply module, and wherein each power supply module executes a respective first table while the mainframe processor calculates the second table for each power supply module and while the mainframe processor transfers the second table to each power supply module.

Other embodiments and methods of the invention will be discussed with reference to the figures and to the detailed description.

BRIEF DESCRIPTION OF THE FIGURES

The invention will be described by way of example, in the description of exemplary embodiments, with particular reference to the accompanying figures.

FIG. 8 is a graphical illustration of a portion of an I/V characteristic table.

DETAILED DESCRIPTION

While described below for use in a power supply that simulates the response of a solar array, the system and method for improving dynamic response in a power supply can be used in any power supply in which improved dynamic response to a variety of situations is desirable.

Figure 1:
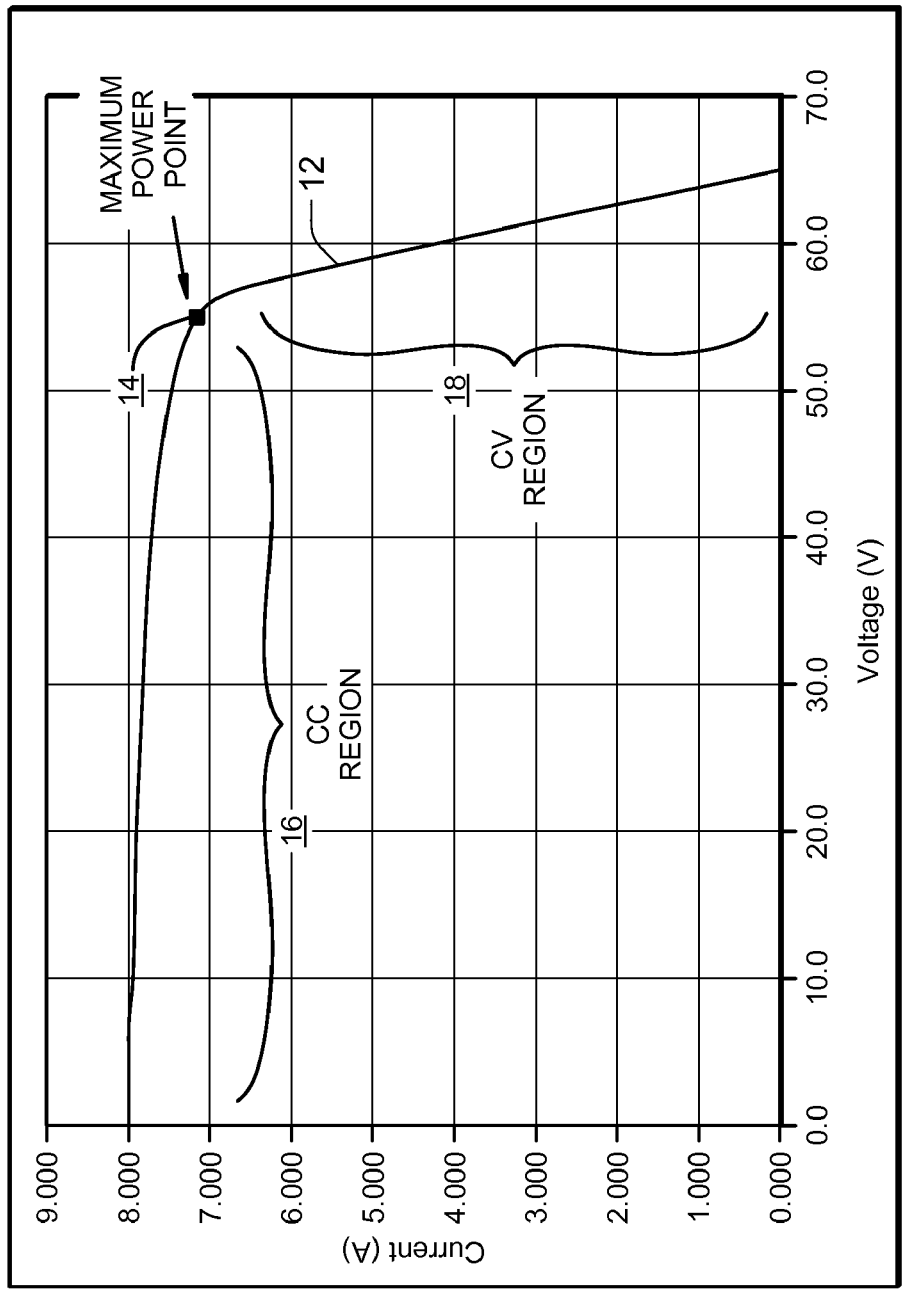
FIG. 1 is a graphical illustration showing a simulation of an I/V characteristic curve of a solar array.

FIG. 1 is a graphical illustration showing a simulation of a typical I/V characteristic curve 10 of a solar array. For example, the simulation of the I/V characteristic curve may be accomplished using a table of I/V pairs, each of which defines a point on the trace 12. A characteristic curve may be defined based on test results or based on specification at some number of I/V operating points. A characteristic curve may also be defined by means of a set of equations. In the case of the exponential model mentioned previously, these equations describe array output voltage as a function of load current. The exponential model equations cannot be inverted to provide a closed form solution for current as a function of voltage, but numerical techniques may be used to achieve the same effect. The trace 12 approximates constant current behavior, shown on the portion 16 of the curve 12, for operating points with voltages below the maximum power point 14, also referred to as the "knee," and approximates constant voltage (CV) behavior, shown on the portion 18 of the curve 12, above the point 14.

Figure 2:
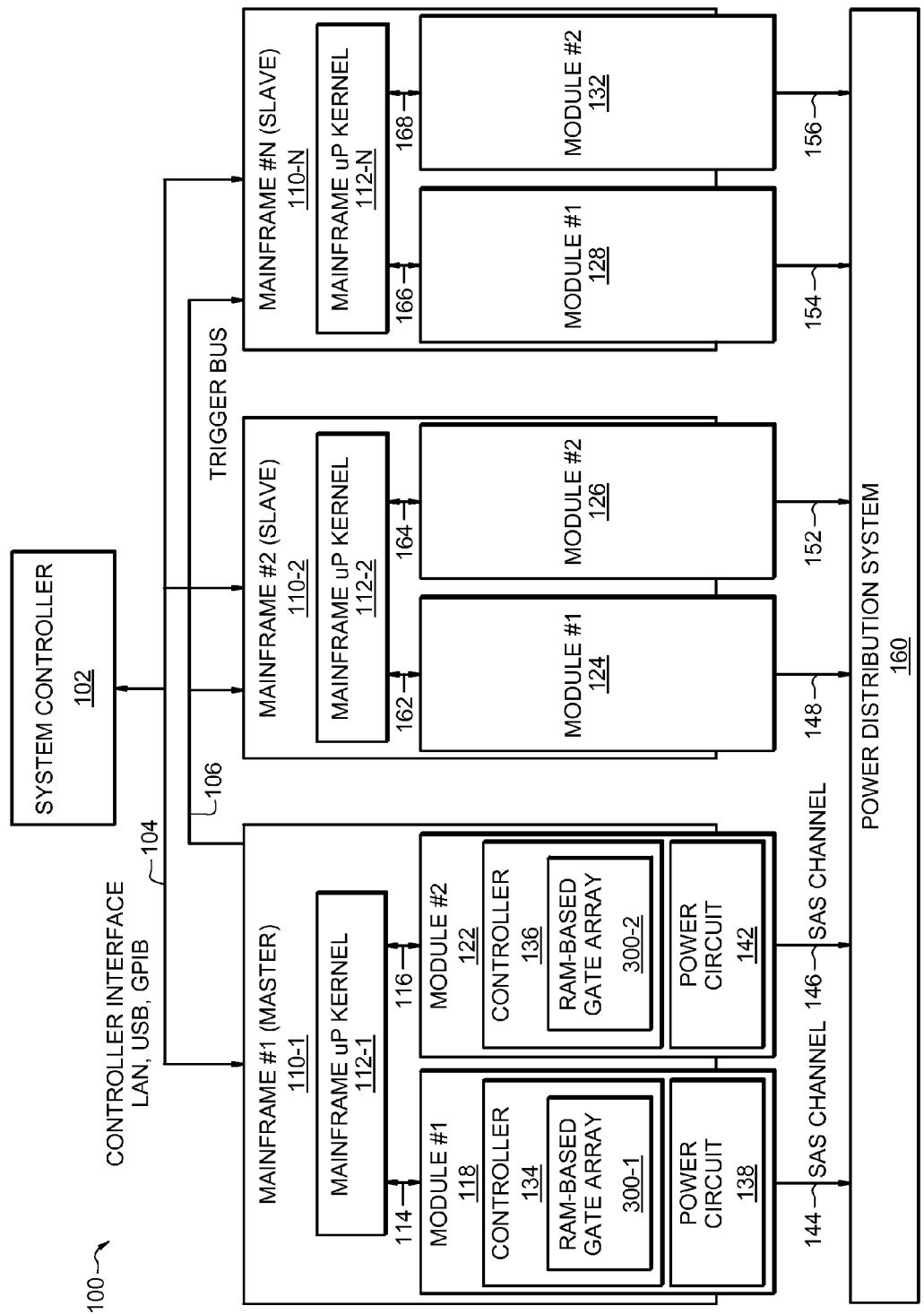
FIG. 2 is a schematic diagram illustrating a simplified power supply including an embodiment of the system for improving dynamic response in a power supply.

FIG. 2 is a schematic diagram illustrating a simplified power supply 100 including an embodiment of the system for improving dynamic response in a power supply. The power supply 100 includes a system controller 102 connected to a plurality of mainframe modules 110 over a controller interface 104. In an embodiment, the system controller 102 provides overall system control and can be implemented using a personal computer (PC) or other general-purpose or special-purpose computing device. The controller interface 104 can be, for example, a bi-directional local area network (LAN), a universal serial bus (USB) interface, a general purpose interface bus (GPIB) implemented in accordance with IEEE 488, or any other bi-directional communication channel over which the mainframe modules 110 can communicate with the system controller 102. In the example illustrated, one of the mainframe modules is considered a master device and the other mainframe modules are considered slave devices. For example, the mainframe module 110-1 can be a master device while the remaining mainframe modules 110-2 through 110-N would be considered slave devices. The master mainframe module 110-1 is coupled to the slave mainframe modules over a trigger bus 106. In this manner, the mainframe module 110-1 can provide trigger signals to the remaining mainframe modules. The trigger signal will be described below. However, the power supply 100 may also contain only one mainframe module 110.

Regardless of whether a mainframe module is a master or a slave device, each of the mainframe modules is similar with regard to the structure and operation of the system and method for improving dynamic response in a power supply. The description to follow will illustrate only the components of the mainframe module 110-1 that describe the structure and operation of the system and method for improving dynamic response in a power supply. Further, the description to follow focuses only on the components, elements and circuitry of a programmable power supply that are germane to the understanding of the system and method for improving dynamic response in a power supply.

In an embodiment, the mainframe module 110-1 includes a mainframe microprocessor 112-1 and includes power supply modules 118 and 122. In alternative embodiments the mainframe module may include a single power supply module, or may include more than two power supply modules. The description to follow assumes that the mainframe module 110 includes two power supply modules. The power supply module 118 is coupled to the mainframe microprocessor 112-1 over connection 114 and the power supply module 122 is coupled to the mainframe microprocessor 112-1 over connection 116. The connections 114 and 116 can comprise a serial communications bus, as described in co-pending U.S. Utility patent application Ser. No. 11/873,429, filed on Oct. 17, 2007, entitled "Improved Communications System for Implementation of Synchronous, Multichannel, Galvanically Isolated Instrumentation Devices, which is assigned to the assignee of this application and which is incorporated herein by reference, and which is a continuation-in-part (CIP) of U.S. Utility patent application Ser. No. 10/857,134, filed on May 28, 2004, entitled "Improved Communications System for Implementation of Synchronous, Multichannel, Galvanically Isolated Instrumentation Devices, which is assigned to the assignee of this application and which is incorporated herein by reference.

The mainframe microprocessor 112 can be a general-purpose or special-purpose high performance floating point microprocessor, or can be a microprocessor kernel that is part of a distributed processing system. In an embodiment, each mainframe module 110 includes two power supply modules. However, as mentioned above, it is contemplated that a mainframe module may include more or fewer power supply modules. Each power supply module 118 and 122 is coupled to the mainframe microprocessor 112 over a physical and logical connection that is generally referred to as a "backplane." A backplane generally comprises the physical and logical connections that provide a communication interface, such as connections 114 and 116, between the power supply modules and the mainframe microprocessor. In an embodiment, the connections 114 and 116 comprise a serial communications interface, as described above, which is implemented using a number of physical connections. However, other communication interfaces are possible. Further, the term "backplane" will be described below in the context of a state machine that can be implemented to address various portions of memory associated with the power supply modules 118 and 122. In such context, the term "backplane" may include any physical, logical, and addressing connections used to couple the mainframe microprocessor 112 to the power supply modules 118 and 122.

The power supply module 118 includes a controller 134, which includes a random access memory (RAM)-based gate array 300-1. The power supply module 134 also includes a power circuit 138. The power circuit 138 comprises the circuitry that connects the power supply module 118 to a power distribution system 160 over a channel 144. In an embodiment, the channel 144 can be a channel that is used to couple a solar array simulator to a satellite power distribution system, or in other embodiments, to any power distribution system.

The power supply module 122 includes a controller 136, which includes a RAM-based gate array 300-2. The power supply module 122 also includes a power circuit 142. The power circuit 142 comprises the circuitry that connects the power supply module 122 to the power distribution system 160 over a channel 146. The elements in the power supply module 122 are similar to the corresponding elements in the power supply module 118.

The mainframe module 110-2 similarly includes a mainframe microprocessor 112-2 which is coupled to the power supply module 124 and to the power supply module 126 over respective connections 162 and 164. The connections 162 and 164 are similar to the connections 114 and 116. The power supply module 124 is connected to the power distribution system 160 over connection 148 and the power supply module 126 is coupled to the power distribution system 160 over connection 152. The elements described above as residing within the power supply module 118 and power supply module 122 are not shown in the power supply module 124 and the power supply module 126 for clarity.

The mainframe module 110-N similarly includes a mainframe microprocessor 112-N which is coupled to the power supply module 128 and to the power supply module 132 over respective connections 166 and 168. The connections 166 and 168 are similar to the connections 114 and 116. The power supply module 128 is connected to the power distribution system 160 over connection 154 and the power supply module 132 is coupled to the power distribution system 160 over connection 156. The elements described above as residing within the power supply module 118 and power supply module 122 are not shown in the power supply module 128 and the power supply module 132 for clarity.

Figure 3:
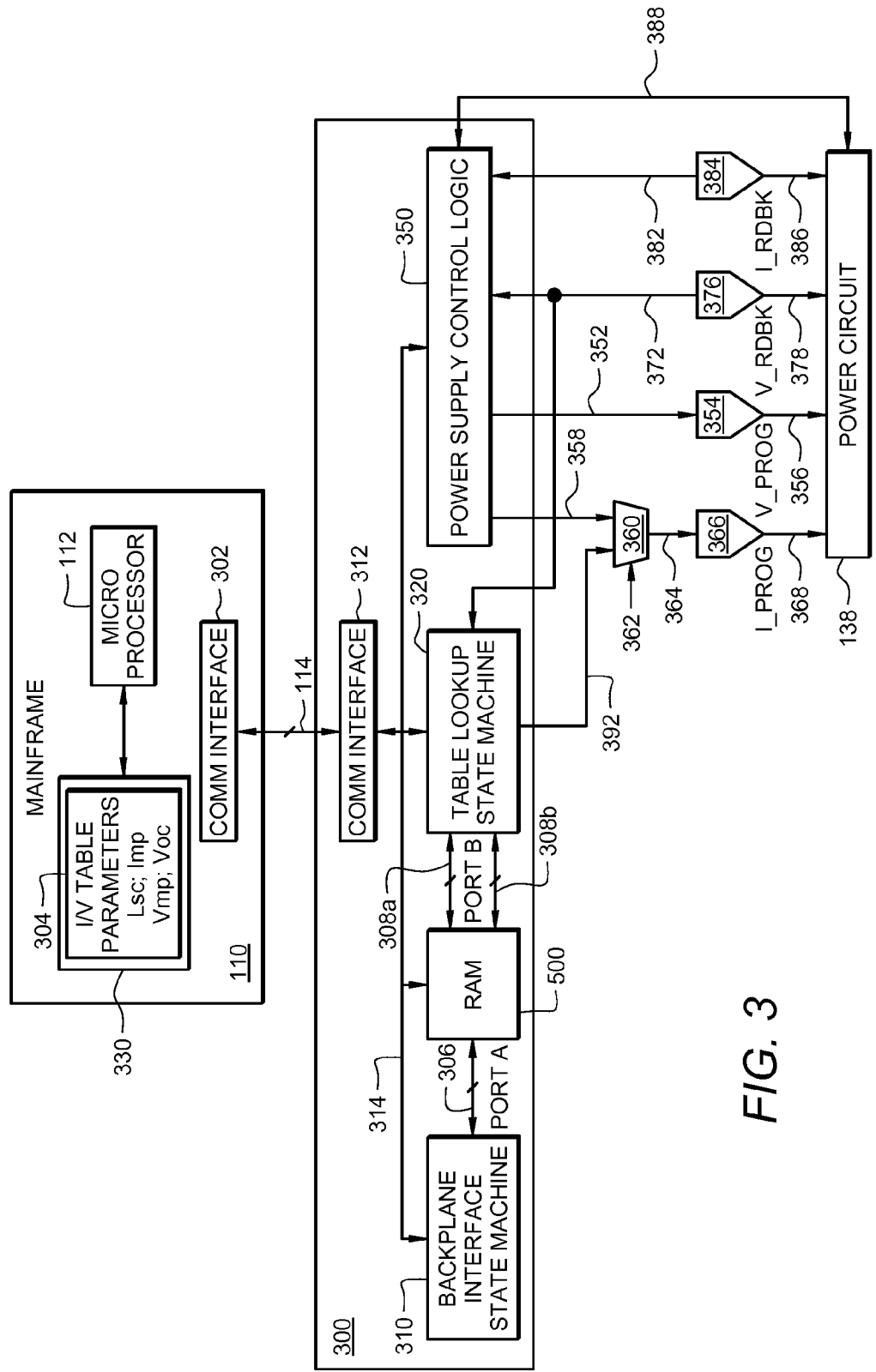
FIG. 3 is a block diagram illustrating an embodiment of the RAM-based gate array of FIG. 2.

FIG. 3 is a block diagram illustrating an embodiment of the RAM-based gate array 300-1 of FIG. 2. The mainframe module 110 and the RAM-based gate array 300 in FIG. 3 will be referred to without a "-1" to indicate that the mainframe module 110 and the RAM-based gate array 300 in FIG. 3 can comprise any of the corresponding elements described in FIG. 2. The RAM based gate array 300 includes a random access memory (RAM) element 500 which, in this embodiment, is configured as a two port RAM device. The control inputs of a first port (port A) of the RAM 500 are coupled to a backplane interface state machine 310 while the control and data read output of a second port (port B) of the RAM 500 is coupled to a table lookup state machine 320. The connection to the table lookup state machine 320 includes an addressing element 308*a* and a read data element 308*b*. In an embodiment, the backplane interface state machine 310 provides control and addressing between the mainframe microprocessor 112 and the RAM 500. Other elements within the RAM-based gate array 300 provide similar functionality for the remainder of circuitry within power supply module 118. These latter elements (not shown in detail for clarity) are contained within communications interface 312 and power supply control logic 350.

The data input and output of port A of RAM 500 is also coupled to the mainframe module 110 via a communications interface 312, which couples over connection 114 to a corresponding communications interface 302 in the mainframe module 110. The communications interfaces 302 and 312 provide signal conversion so that the mainframe module 110 can communicate with the RAM based gate array 300.

As mentioned above, the RAM-based gate array 300 also includes power supply control logic 350. The power supply control logic 350 includes the processing and control logic that generally controls the operation of the power supply module 118. The power supply control logic 350 includes functionality that enables the power supply module 118 to operate in a plurality of different modes, one mode including operation as a solar array simulator. It should be mentioned that the power supply module 118 can also operate as a programmable power supply that does not simulate the operation of a solar array.

The backplane interface state machine 310, RAM 500, table lookup state machine 320 and the power supply control logic 350 are coupled to the communications interface 312 over connection 314. The connection 314 conveys control information, data, and trigger signals.

The power supply control logic 350 is coupled to the power circuit 138 through digital-to-analog (D/A) converter 354 and D/A converter 366, and through analog-to-digital (A/D) converter 376 and A/D converter 384. An input to the D/A converter 366 is generated through a multiplexer 360. The multiplexer 360 is controlled by a control signal, referred to as SAS_MODE, over connection 362. The control signal on connection 362 determines whether the input to the D/A converter 366 originates over connection 392 from the table lookup state machine 320, or over connection 358 from the power supply control logic 350. The output of the multiplexer 360 is provided to the D/A converter 366 over connection 364.

The control signal on connection 362 is de-asserted to cause the power supply module 118 to operate as a programmable power supply that is not configured as a solar array simulator. In such mode of operation, the current programming signal $I_{PROG}$ is supplied to the power circuit 138 from the power supply control logic 350. The control signal on connection 362 is asserted to cause the power supply module 118 to operate as a programmable power supply that is configured as a solar array simulator, as described herein. In such mode of operation, the current programming signal $I_{PROG}$ is supplied to the power circuit 138 from the lookup table state machine 320 over connection 392, as will be described below.

The power supply control logic 350 supplies a voltage programming signal, $V_{PROG}$ over connection 352 to the D/A converter 354, which supplies the $V_{PROG}$ signal over connection 356 to the power circuit 138.

The power circuit 138 supplies a voltage measurement data signal, referred to as $V_{RDBK}$ over connection 378 to the A/D converter 376. The A/D converter 376 supplies the voltage measurement data signal, $V_{RDBK}$, over connection 372 to the power supply control logic 350 and to the table lookup state machine 320.

The power supply control logic 350 also exchanges control and status information with the power circuit 138 over connection 388.

In an embodiment, the mainframe module 110 includes a memory element 330 that includes I/V table parameters 304. The I/V table parameters include, in this example, which assumes use of the exponential model to simulate the I/V characteristics of a solar array, short circuit current (Isc), current at maximum power (Imp), voltage at maximum power (Vmp), and open circuit voltage (Voc). The use of other models to simulate the I/V characteristics of a solar array is possible. As will be described in greater detail below, the mainframe microprocessor 112 uses the parameters 304 to calculate tables of ordered IV pairs that are sent to the RAM 500. The tables of I/V pairs define the characteristic curve of a solar array so that the array's characteristics can be accurately simulated.

In the example embodiment described in FIG. 2 and FIG. 3, each of the two power supply modules 118 and 122 associated with mainframe module 110 functions as an independent SAS channel capable of sourcing up to approximately 600 W of power. The mainframe microprocessor 112 in each mainframe module 110 calculates tables of ordered I/V pairs, while each RAM-based gate array 300 rapidly implements SAS table look-up algorithms by operating on pre-computed tables supplied from the mainframe microprocessor 112. The parallel architecture in each mainframe module 110 provides for simultaneous, parallel, high bandwidth transfer of data between the mainframe microprocessor 112 and the RAM-based gate array 300 situated in each power supply module. The overall arrangement is highly suited to implementation of a parallel processing based system for simulation of large solar arrays and provides for exceptional dynamic response characteristics. This translates to significantly greater capability for simulating satellite solar array systems under dynamic operating conditions.

Referring to FIGS. 2 and 3, upon user command, the system controller 102 provides "lists" of SAS table parameters to each mainframe microprocessor 112 in each mainframe module 110. For table-based implementations of solar array simulations using the exponential model, the I/V relationship is established by equations with four input parameters: short circuit current (Isc), current at maximum power (Imp), voltage at maximum power (Vmp), and open circuit voltage (Voc). These parameters are stored in each mainframe module 110 and computed by the mainframe microprocessor 112.

Because the I/V table for a given array and illumination condition is completely defined by these four parameters when the exponential model is used, it is possible to store very long lists of table parameters in memory 330 associated with the mainframe module 110. The use of any mathematical model that defines an I/V curve using a brief list of parameters offers a similar advantage in the embodiment described. Once parameter lists are stored for each power supply module (with appropriate phase offsets to reflect differing orientations of individual panels simulated by each module or "channel" or, alternatively with differing parameters if the solar array panels are different), the mainframe microprocessor 112, in each mainframe module 110, calculates tables of ordered I/V pairs using successive sets of values for Isc, Imp, Vmp, and Voc. These tables are calculated on demand and then transferred to the power supply modules 118 and 122 for execution. Demand is established by means of system-wide commands to update tables. The term "execution" in this context refers to the power supply modules 118 and 122 searching the tables to find constant current programming entries within the tables corresponding to successive measurements of load voltage. Table execution takes place independently in the hardware processing system, i.e., the RAM-based gate array 300, provided in each module and will be described in greater detail below.

System-wide commands to update I/V tables are directed from the master mainframe module (110-1 in this example) to the slave mainframe modules (110-2 through 110-N in this example) over the trigger bus 106. In this example, the master mainframe module 110-1 is referred to as the "system trigger source." Triggering signals within the master mainframe module 110-1 may originate from commands supplied by the system controller 102, from an internal timer not shown), that can be controlled by a list of dwell times, which has entries for each set of SAS table defining parameters (Isc, Imp, Vmp, and Voc), or from an external trigger source. Trigger signals from the master mainframe module 110-1 are directed to its power supply modules 118 and 122 and to the trigger bus 106. Mainframe modules designated as "slaves" receive trigger signals from the master mainframe module 110-1 via the trigger bus 106 and immediately pass these through to their respective power supply modules 124, 126, 128 and 132. With available serial communications timing constraints defined by the above-described architecture, overall synchronization of table changes across the entire system will typically be within ±2.5 µs. Refinements to the serial communications protocol may be used to reduce synchronization errors to less than 1 µs.

In an embodiment, the distributed processing described in FIG. 2 ensures that each mainframe microprocessor 112 is used to calculate I/V tables for no more than two power supply modules. As additional power supply modules are added to the system, additional mainframe modules are also added so that the processing resources automatically scale with the size of the overall system. As a consequence, table update bandwidth is not adversely affected by increasing the total number of channels in the system. Similarly, because each power supply module has a dedicated hardware processor for "execution," adding channels also has little or no impact on the dimension of dynamic performance controlled by these processors, i.e. table look-up bandwidth.

Figure 4:
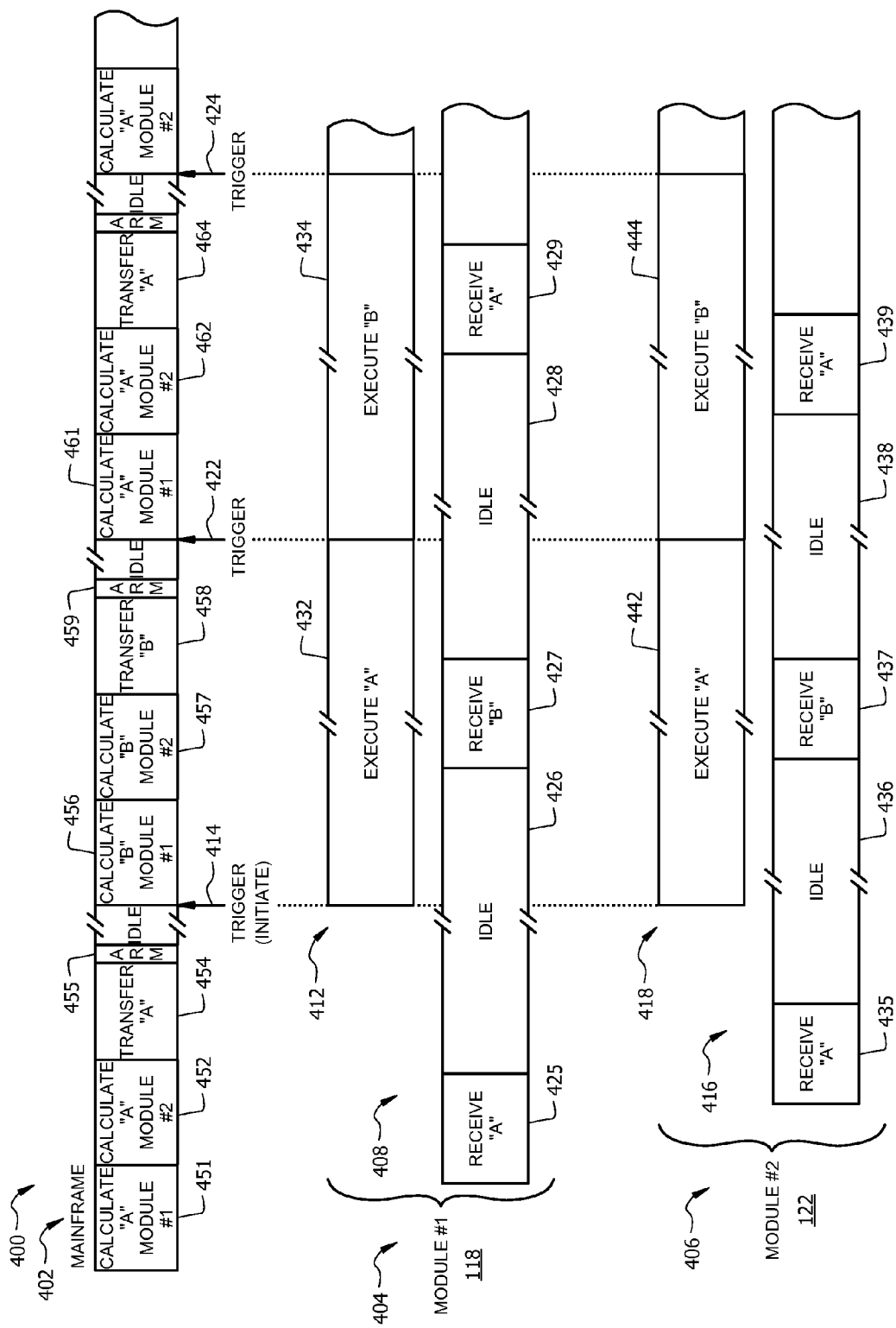
FIG. 4 is a timing diagram illustrating the timing relationship of the communication between the processor and each power supply module.

FIG. 4 is a timing diagram 400 illustrating the timing relationship of the communication between the mainframe microprocessor 112 and each power supply module 118 and 122. For purposes of the timing diagram 400, the first power supply module 118 is referred to as module #1 while the second power supply module 122 is referred to as module #2. The timing sequence of the mainframe microprocessor 112 is shown using timing sequence 402, the timing sequence of the power supply module #1 is shown at 404 and the timing sequence of the power supply module #2 is shown at 406. The mainframe microprocessor 112 will alternatively compute I/V tables for the power supply modules 118 and 122. For ease of description, the alternate I/V tables will be referred to herein as table "A" and table "B." Further, table "A" can be referred to as a "first" table and table "B" can also be referred to as a "second" table. It should be noted that the designations of tables as "A" and "B" is wholly arbitrary and intended only to illustrate the sequential nature of table calculation, transfer, and execution. The tables being calculated and executed for individual channels at any point in time may be identical, identical while differing in phase, or entirely different from tables in similar states on one or more other channels. The designations "A" and "B" also bear no relationship to the designations of ports "A" and "B" in RAM element 500 described below.

The mainframe microprocessor 112 calculates I/V pairs for a first table in its parameter list 304 and transfers this table to the RAM 500 in each power supply module. As shown in the timing sequence 402, a first I/V table (designated table "A") is calculated for a first power supply module 118 during the time period 451 and a first I/V table (also designated table "A" although it may have different defining parameters or phase from the table "A" calculated during time period 451) is computed for a second power supply module 122 during the time period 452. During time period 454 the first "A" tables are simultaneously transferred to both the power supply module 118 and to the power supply module 122, as illustrated at time periods 425 and 435, respectively. The simultaneous transfer of the "A" tables to both power supply modules 118 and 122 is enabled due to the parallel nature of the communications architecture of mainframe 110 and to the structure of the memory (RAM 500) within the RAM-based gate array 300. The structure of the memory (RAM 500) within the RAM-based gate array 300 will be described in greater detail below.

Once the "A" tables are in place for all power supply modules 118 and 122, the mainframe microprocessor 112 initiates table execution in the power supply modules by transmitting an arming command to the power supply modules, as shown at time period 455, thereby enabling the power supply modules 118 and 122 to respond to a single triggering event.

At a time indicated by the trigger signal 414, which is delivered from the master mainframe module 110-1 to all of the slave mainframe modules and to the power supply modules within each of the mainframe modules, the tables "A" are executed by the power supply modules 118 and 122, as illustrated during time periods 432 and 442, respectively. These tables are executed by the power supply module table lookup state machines 320 in each power supply module 118 and 122.

While the "A" tables are being executed by each of the power supply modules 118 and 122, the mainframe microprocessor 112 calculates a second table, referred to as a "B" table, for power supply module 118 during the time period 456, and calculates a second table, referred to as a "B" table, for power supply module 122 during the time period 457. As stated above, the "B" tables may be identical, identical while differing in phase, or entirely different for each power supply module. During the time period 458 the "B" tables are simultaneously transferred from the mainframe microprocessor 112 to the power supply modules 118 and 122, as illustrated during time periods 427 and 437, respectively.

The mainframe microprocessor 112 again arms the power supply modules 118 and 122 during time period 459. At a time indicated by the trigger signal 422, the power supply module 118 and the power supply module 122 each execute the "B" tables as shown during time periods 434 and 444, respectively.

While the "B" tables are being executed by the power supply modules 118 and 122, the mainframe microprocessor 112 recalculates a revised "A" table for power supply module 118 during time period 461 and recalculates a revised "A" table for power supply module 122 during time period 462. Once again, these revised "A" tables may be identical or different in content. During time period 464, the recalculated "A" tables are transferred from the mainframe microprocessor 112 to both module power supply modules 118 and 122, as illustrated during time 429 and 439, respectively. The process then continues to repeat such that the mainframe microprocessor 112 recalculates alternate tables, while the opposite tables are being executed in the respective power supply modules 118 and 122. It should be noted that the structure of the RAM 500, which will be described in greater detail below, allows a table (e.g., table "A") to be executed by the power supply module, while another table (e.g., table "B") is being loaded into the RAM 500.

The process of calculating tables in the mainframe microprocessor 112, loading the tables into the power supply modules and simultaneously executing the tables in the power supply modules repeats until terminated by a command from the mainframe microprocessor 112. Using readily available processing technology, the anticipated time lapse between triggering events and the availability of an updated table within the power supply modules is approximately 250-500 ms for a 4096 point table. An alternative low resolution, high speed mode can be implemented to provide 256 point tables with a proportional shortening of time for table updates. In this low resolution, high-speed mode, table update latencies of approximately 30-50 ms are expected. Other practical embodiments using available, but more costly, technology could be used to provide significantly faster update rates.

It is shown in FIG. 4 that the use of hardware-based parallel processing within power supply modules permits execution of one table at the same time data is being transferred to a second table located within that same power supply module.

In addition to the tables of ordered I/V pairs, it may be advantageous to send other control information as part of each trigger initiated data transfer, and the transfer of such other data is contemplated herein. The transmission of I/V tables and other control information is more efficient if the data is sent as a single seamless block without interruptions to set or change address locations within the power supply modules. As will be described below, memory elements and circuits within the power supply module that perform address control are designed to accept disparate data elements as a single block. In addition, an auto-indexing methodology automatically increments addresses thereby further improving the timing efficiency of table transfers.

Figure 5:
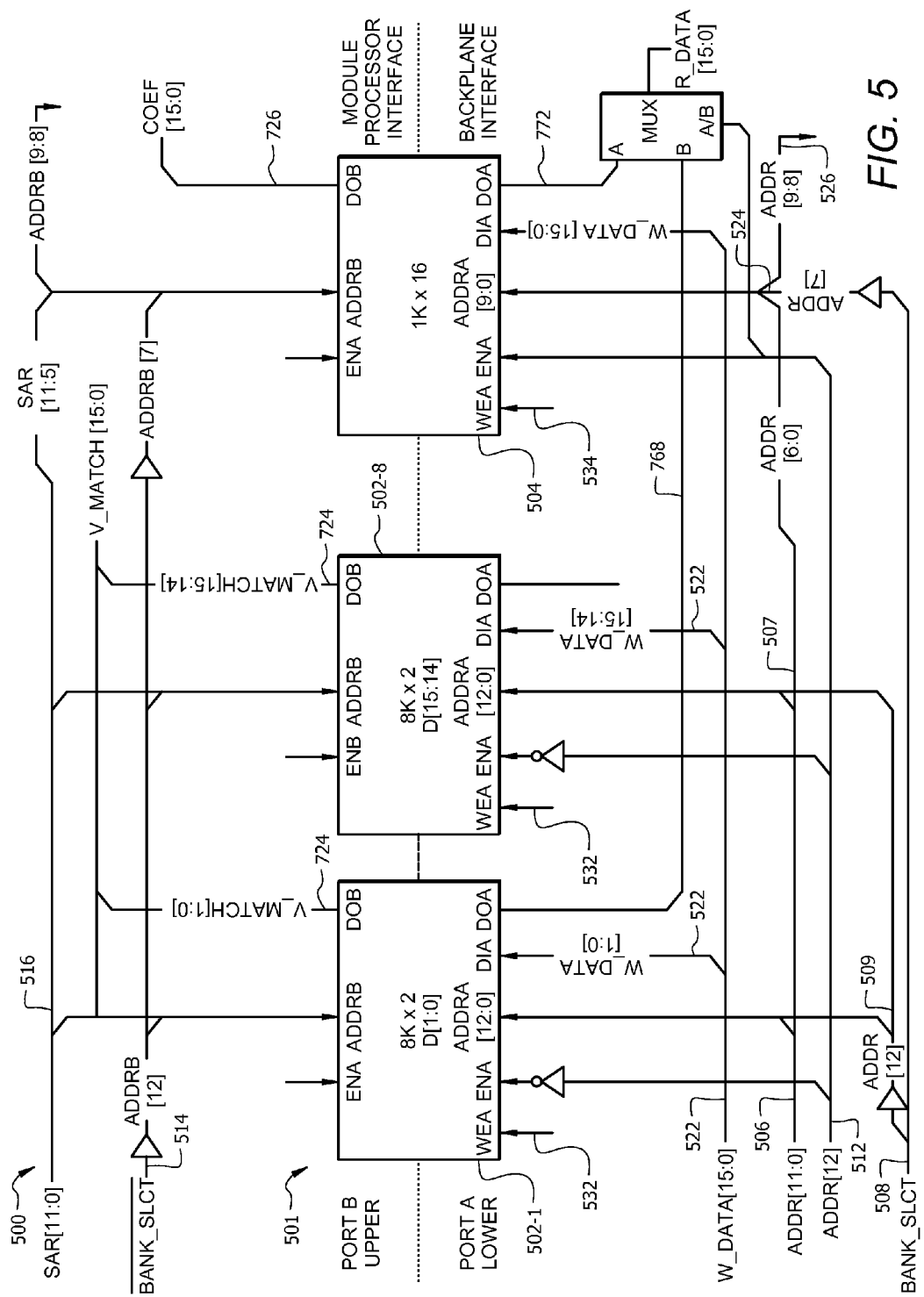
FIG. 5 is a block diagram illustrating an example of the RAM of FIG. 3.

FIG. 5 is a block diagram illustrating an example of the RAM 500 of FIG. 3. The structure of the RAM 500 is referred to as "dual port." For purposes of discussion, the two ports will be referred to as "port A" and "port B." However, the nomenclature of the ports A and B should not be confused with tables "A" and tables "B" mentioned in the discussion of FIG. 4 above. The I/V tables denoted as tables "A" and tables "B" computed by the mainframe microprocessor 112 are loaded into the RAM port designated as "port A" according to the operation of the backplane interface state machine 310 (FIG. 3). The table lookup state machine (320 of FIG. 3) accesses these tables via the RAM port designated as "port B" to execute the tables.

The RAM 500 comprises a number of memory blocks, referred to as 502-1 through 502-8, in this example, to illustrate the arrangement of an 8K×16 block that is made up of eight (8) 8K×2 sub-blocks, denoted 502-1 through 502-8. The RAM 500 further includes a 1K×16 memory sub-block block

504. The eight memory blocks 502-1 through 502-8 are shown for illustrative purposes only. More or fewer memory blocks may be implemented.

FIG. 5 illustrates one manner in which the memory resources in the RAM 500 may be organized within each power supply module to facilitate reception of I/V pairs (as the tables "A" and "B" as described above) together with other information types. Although the RAM 500 described herein has a dual-port structure, it is not necessary to have a dual-port structure. However, the dual-port structure provides certain conveniences and advantages. For purposes of discussion, the lower portion of the drawing depicts access to port A of the RAM 500 and the upper part of the drawing depicts access to port B of the RAM 500. The lower portion of FIG. 5 depicts the control and addressing access provided to the backplane state machine 310, while the upper portion of FIG. 5 depicts the control, address, and data access provided to the table lookup state machine 320.

In an embodiment, as stated above, the RAM 500 is arranged to provide two distinct sub-blocks. One of these is configured as an 8K×16 block 501 made up of eight (8) 8K×2 sub-blocks 502-1 through 502-8, while the other is configured as a 1K×16 block 504. However, other memory partition architectures are possible. In an embodiment, the use of 8K×2 sub-blocks is driven by the available feature set of a particular field programmable gate array (FPGA). It is desirable to physically separate the I/V tables, which are loaded into the 8K×16 block 501 from the remaining RAM resource, i.e., the 1K×16 sub-block block 504. As will be described in detail below, to facilitate the execution of the I/V tables in the RAM-based gate array 300, it is desirable to provide a set of coefficients for a digital lowpass filter. These coefficients are loaded into the sub-block 504. As will also be described in detail below, the addressing of RAM sub-blocks 501 and 504 at port B is identical under steady-state conditions, but generally will be different during transient events.

Figure 6:
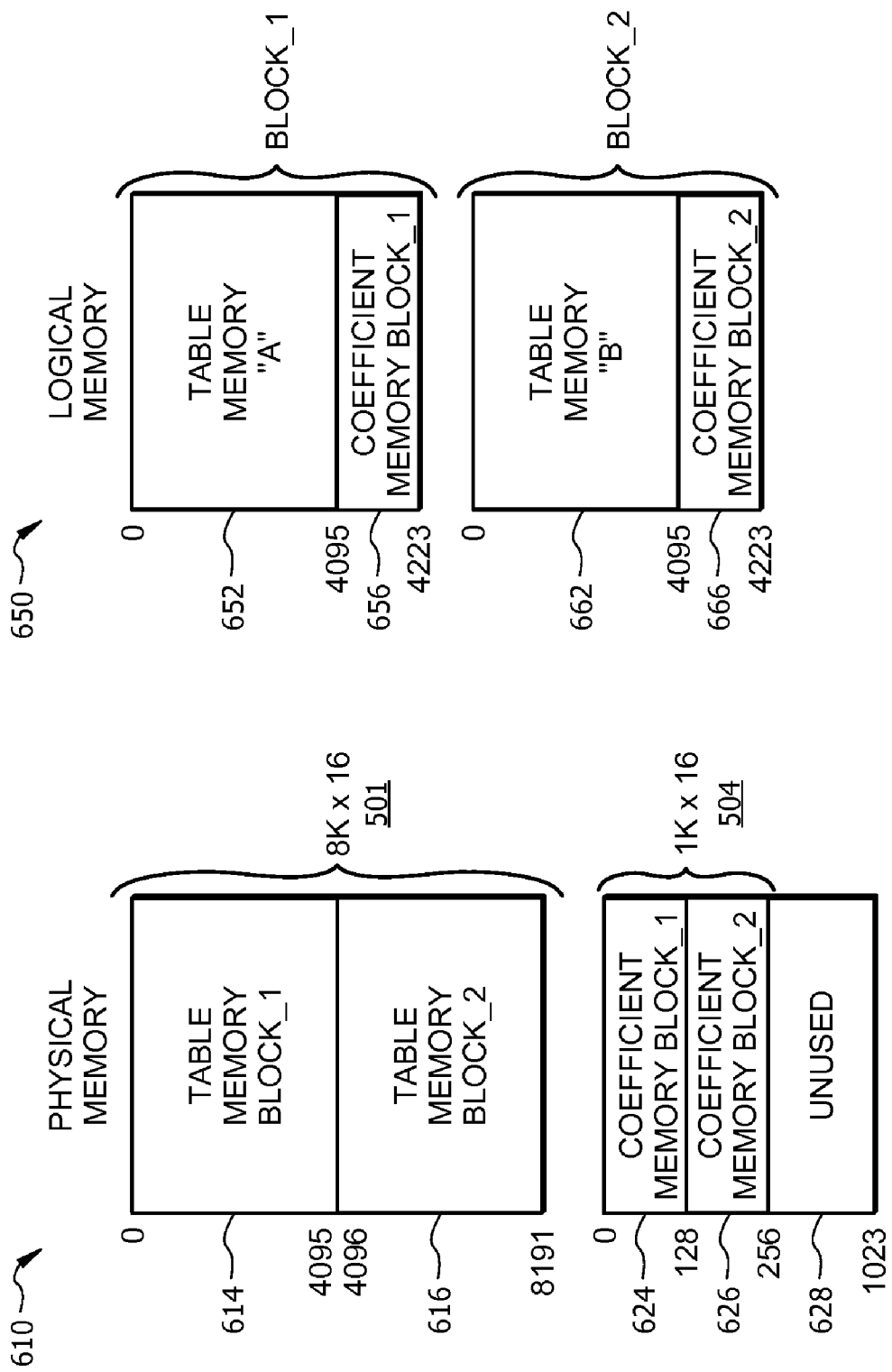
FIGS. 6A and 6B are a block diagram collectively illustrating the physical and logical memory structure of the RAM of FIG. 5.

FIGS. 6A and 6B are a block diagram collectively illustrating the physical and logical memory structure of the RAM 500 of FIG. 5. In FIG. 6A, the 8K×16 block 501 is illustrated as having a lower portion 614, comprising table memory block_1, ranging from address location 0 through address location 4095, and an upper portion 616, comprising table memory block_2, ranging from address location 4096 to address location 8191.

The 1K×16 block 504 stores the filter coefficient for memory block_1 in portion 624 and stores the filter coefficient for memory block_2 in portion 626.

FIG. 6B shows the logical contents of the 8K×16 block 501 and the 1K×16 block 504, where the table memory block_1 comprises portion 652 and the filter coefficient for memory block_1 comprises portion 656. The table memory block_2 comprises portion 662 and the filter coefficient for memory block_2 comprises portion 666.

Referring again to FIG. 5, the address signals ADDR[11:0] on connection 506 are used to directly address a 4K range in the 8K×16 block 501 via the ADDRA[11:0] inputs while the signals ADDR[6:0] on connection 507 are used to address a 128 word range in the 1K×16 block 504 via the ADDRA[6:0] inputs. The signal ADDR[12] is used in inverted form to enable the 8K×16 block 501 and is also used in non-inverted form to enable the 1K×16 RAM block 504. Assuming that the signal BANK_SLCT on connection 508 is kept in a logic low state, the connection of ADDR[12:0] to the two RAM blocks 501 and 504 over connections 506, 507, and 512 establishes a contiguous address range from 0-4223, i.e. 0-(4095+128), which seamlessly switches from one physical RAM block (614 in FIG. 6A) to the other RAM block (616 in FIG. 6A) when the logical address transitions from a value of 4095 to a value of 4096. This arrangement establishes the desired contiguous address space while also providing access to two physically distinct RAM blocks. Note that connection 509 is also labeled ADDR[12]. This designation refers to its logical function with respect to RAM block 501 which is distinct from the function of signal (connection) 512 which functions as ADDR[12] from the standpoint of port A address generation as provided within the backplane interface state machine 310. Further details for port A address generation are provided below in the discussion of FIG. 9.

The physical arrangement of the RAM is such that tables A and B (also referred to as "table memory block_1" and "table memory block_2" in the discussion of FIGS. 6A and 6B) are always present in RAM when the power supply module is operational and are actually contiguous with the highest order RAM address bit serving as the "switch" between tables. The highest order address bit is ADDR[12] for RAM block 501 and ADDR[7] for RAM block 504. One or the other of these tables, either upper or lower depending on the current state, is always available to the port B side table lookup state machine 320 for "execution". The other table is always available to mainframe microprocessor 112 via the port A side backplane interface state machine 310 for updating. Once the updating is completed, two fully usable tables are present in RAM. One of these tables is executing, while the other table is pending until a table change trigger is received. Upon receipt of the table change trigger, the pending table becomes the execution table and the previously executing table becomes accessible to the port A side mainframe microprocessor 112 for updating. This is true for both for the I/V tables and for the coefficient tables.

Figure 9:
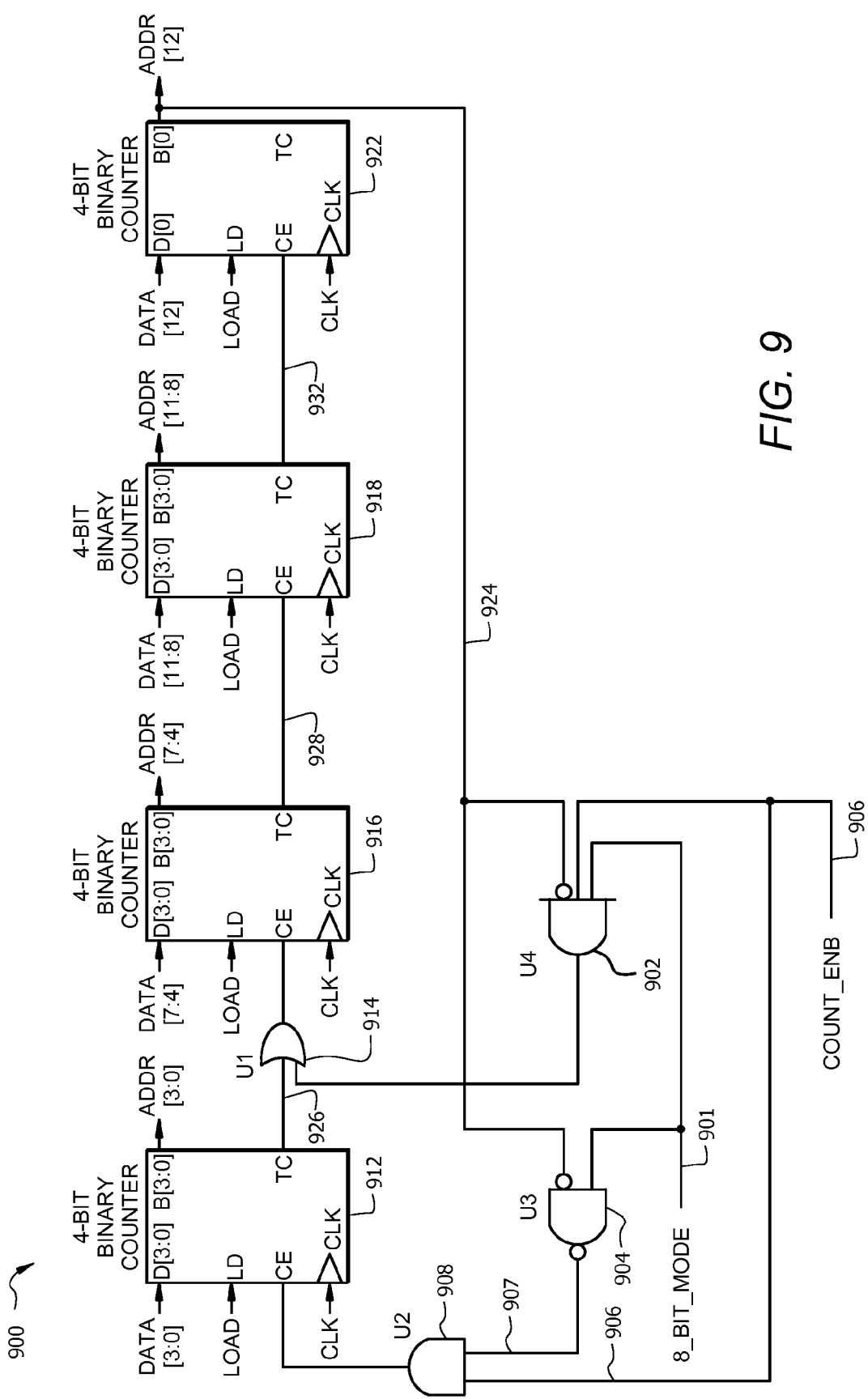
FIG. 9 is a schematic diagram illustrating example circuitry that can be used to control the resolution of the I/V table.

If the serial transmission system used to transfer data from the mainframe microprocessor 112 in the mainframe module 110 to the power supply modules 118 and 122 is configured through the backplane interface state machine 310 to drive the write enable inputs 532 and 534 of the two RAM blocks 501 and 504, respectively, when parallelized serial data is properly presented to the parallel data input ports 522 (W_DATA[1:0] and W_DATA[15:14]) of the RAM and, additionally, if control logic is provided to enable incrementing of a binary counter, described in the discussion of FIG. 9 below, connected to the address inputs 506 and 512 of the RAM blocks 501 and 504 at a different time during each serial packet transmission period, then it becomes possible to set a starting address by pre-loading the counter after which a new data word may be written to the RAM blocks 501 or 504, depending upon the current address value, on each subsequent serial communications packet with automatic incrementing (auto-indexing) of addresses. This method establishes an optimally efficient means for transferring related, but physically separable data from the mainframe module 110 to the power supply modules 118 and 122. The parallel serial data paths 114 and 116 between the mainframe module 110 and the power supply modules 118 and 122 provides the desired highly efficient system-wide means for transferring new tables and control information in parallel to every power supply module in the system 100.

The BANK_SLCT signal on connection 508 can be set to a logic high state or a logic low state. The BANK_SLCT signal on connection 508 is buffered and is applied as ADDR[12] to the port A RAM address ADDRA[12:0] on connection 509 for the 8K×16 block 501. The BANK_SLCT signal on connection 508 is also applied as the signal ADDR[7] to port A RAM address ADDRA[7:0] on connection 524 for the 1K×16 block 504. Applied in this manner, BANK_SLCT acts to address logical tables "A" (block_1) or "B" (block_2) as described above whereby table "A" (block_1) comprises the lower 4K locations (614 in FIG. 6A, 652 in FIG. 6B) in the 8K×16 block 501 while table "B" (block_2) comprises the upper 4K locations (616 in FIG. 6A, 662 in FIG. 6B) in the 8K×16 block 501. Similarly, table "A" (block_1) comprises the first 128 locations (624 in FIG. 6A) in the 1K×16 block 504 while table "B" (block_2) comprises the next 128 locations (626 in FIG. 6A) in the 1K×16 block 504. The remaining 768 locations (628 in FIG. 6A) in the 1K×16 block 504 are unused so the ADDRA[9:8] port A RAM address inputs on connection 526 are tied low.

It should be noted that the arrangement described here may be easily extended to include additional physical blocks of RAM or to include individual control registers the contents of which might be used for other purposes. Blocks of RAM may also be of different sizes based on specific applications.

In an embodiment of the system and method for improving dynamic response in a power supply, the table lookup state machine 320 (FIG. 3) can be implemented to access the port B side of the RAM 500 to efficiently execute the I/V tables A and B.

The control of a power supply module, such as power supply module 118, so that its output conforms to the desired characteristic I/V curve is accomplished by measuring voltage (or a combination of voltage and current), comparing the measured value to a desired value, and modifying at least one control input to the power supply module to minimize errors between the desired output and the actual output. Such a feedback control system is generally implemented in the power supply module 118 by means of a digital feedback system comprising one or more A/D converters, which digitize the output voltage and/or current, a digital signal processor (DSP) computational system, which compares the measured value to a desired value, and which performs corrective signal calculations, and one or more D/A converters, which convert the updated digitally-generated corrective control signals back to analog form for driving the power supply module. The reference input to the digital comparator embedded in the feedback loop is the I/V characteristic table stated in digital form. Typically, entries in this table comprise floating point representations of I/V pairs corresponding to some number of operating points along the desired characteristic curve. With modern DSP processors and widely available A/D and D/A converters, this approach supports effective implementations for table update (sampling) rates in the range of 10-30 µs or longer.

A higher sampling rate equates to improved dynamic performance or bandwidth with respect to detection and reaction to changes in load. The sampling rate is limited by the conversion times of the A/D and D/A converters, but DSP processing time also contributes significantly to the total time required to deliver an updated control input to the power supply module. For the A/D converter in particular, significant improvements in sampling rate implies substantial increases in cost. This being the case, a cost-effective method for dramatically reducing DSP processing time coupled with more modest improvements in raw conversion rates for A/D and D/A converters provides a cost-optimized means for improving overall sampling time for the digital feedback system and thus bandwidth as perceived by the user.

Referring momentarily to the upper portion of FIG. 5, improvements in speed of table look-up operations and thus bandwidth in response to load changes are described. The signals SAR[11:0] on connection 516 are connected to the ADDRB inputs (Port B address) of the 8K×16 RAM block 501 while signals SAR[11:5] are connected to the ADDRB inputs (also Port B address) of the 1K×16 RAM block 504. These connections respectively help to implement the voltage match and filter coefficient look-up features, which will be described below. The inverse of the BANK_SLCT signal on connection 514 is used to select between two available 4K I/V RAM blocks and two available 128 word coefficient RAM blocks as described above.

Figure 7:
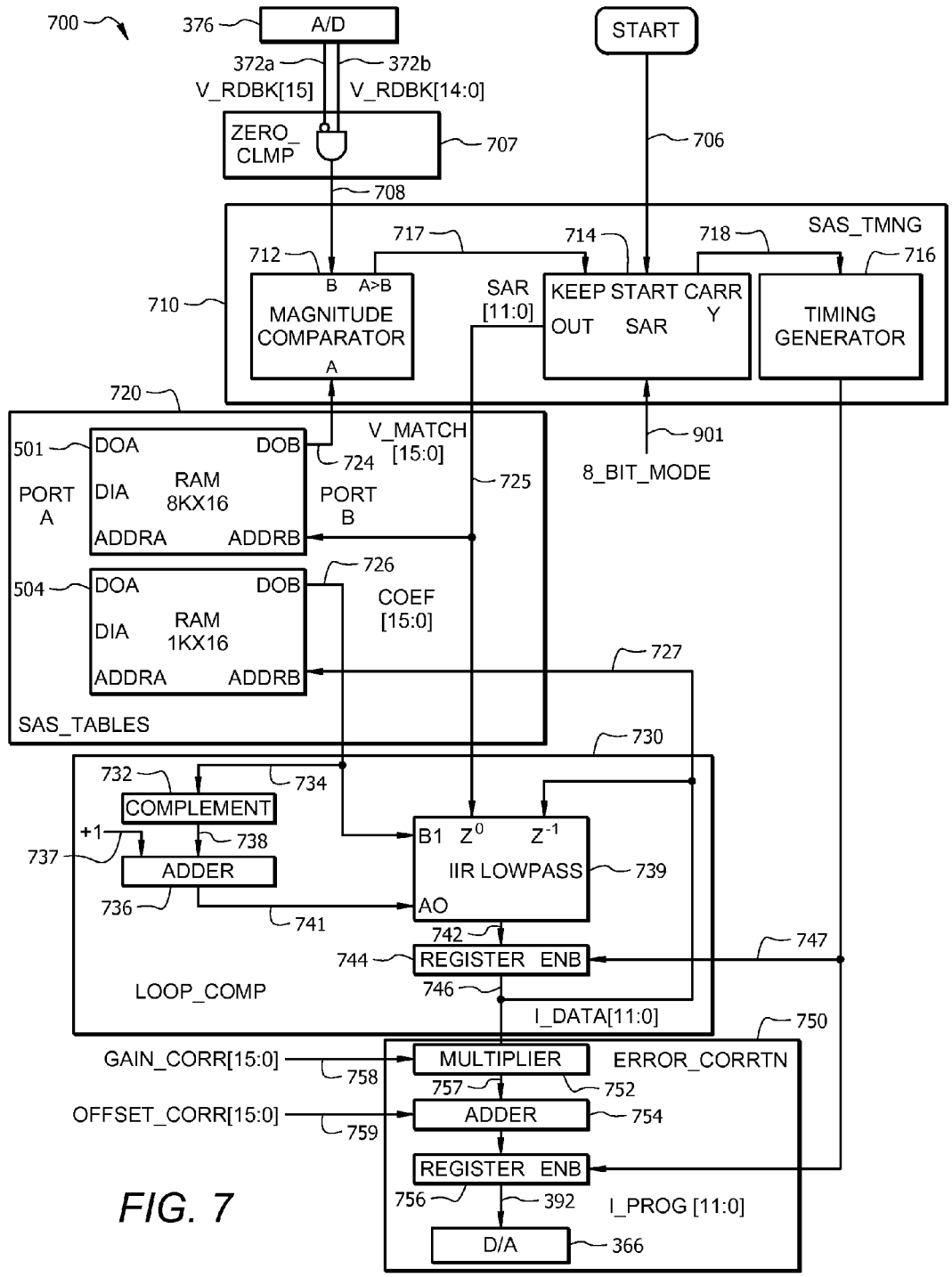
FIG. 7 is a block diagram illustrating an embodiment of the table lookup state machine of FIG. 3.

FIG. 7 is a block diagram illustrating an embodiment of the table lookup state machine 320 of FIG. 3. The table lookup state machine 320 can be implemented using hardware and logic described in a digital signal processor (DSP) implementation of the state machine 700. In the embodiment shown in FIG. 7, the DSP function is implemented as low level computational blocks in hardware, i.e. as hardware functions in a field programmable gate array (FPGA). As will be described, this arrangement provides high performance at very low incremental cost. The design is especially cost-effective because the FPGA is part of the RAM-based gate array 300 and is already present to provide other functions within the power supply module.

The state machine 700 includes an A/D converter 376, which, in this embodiment, measures and digitizes a voltage output of the power supply module 118. Digitized samples of the output voltage are received as inputs V_RDBK[15] over connection 372a and V_RDBK[14:0] over connection 372b. This data is in 16-bit 2's complement form. Because the control algorithm should not be supplied with negative values and because it is desirable to strike an optimum balance between complexity, gate utilization, and minimized execution time, the most significant or "sign bit" (bit 15 in this embodiment) is tested and the input data clamped to zero if bit 15 is true. Testing and clamping occurs in the zero clamp element 707. The zero clamp element 707 ensures that the measured voltage signal on connection 708 is always a positive value. The zero clamp element 707 operates by forcing the signal V_RDBK[14:0] on connection 372b to a low state if the signal V_RDBK[15] on connection 372a is high. In other words, if the MSB is true, then V_RDBK is a negative value in 2's complement coding in which case a zero is forced. The signal V_RDBK[15] as applied to the magnitude comparator 712 is always tied low. The overall effect is to cause negative voltage measurements, which are possible, to be treated as if they were measurements exactly equal to zero volts.

The measured voltage signal on connection 708 is supplied to timing element 710. The timing element 710 comprises a magnitude comparator 712, a successive approximation register (SAR) 714 and a timing generator 716.

Two I/V tables are stored in RAM located within the tables element 720. One of these tables is active and the other table is pending, as described above. The following discussion will focus on read access to the active table located in the RAM block 501. The active table is 4K points long and stores voltage values corresponding to current programming D/A values. An important definitional feature of the arrangement of data is that the stored voltage values are paired to current values, which are scaled to the address range of the table. A portion of an I/V characteristic table is shown in FIG. 8. Stated another way, each of the 4K addresses corresponds to one of 4K possible digital inputs to the 12-bit D/A converter 366, which controls the desired output range of current from the power supply module. In this embodiment, and as described above, RAM is available in a dual port structure. Port A is used for backplane access (referring to the mainframe microprocessor 112 of FIG. 2 (and also to the backplane interface state machine 310 of FIG. 3) accessing port A of the RAM block 501) while Port B of the RAM block 501, is reserved for read access by the table lookup state machine 320, 700.

Port B of the RAM block 501 operates in read-only mode using addresses generated by the successive approximation register (SAR) 714 located within the timing block 710. In response to an initiation signal supplied over connection 706 to the timing element 710, the SAR 714 begins to successively turn on addresses SAR[11:0] which control addressing at port B of the RAM block 501. The process begins with the most significant address bit. Positive unipolar, i.e., unsigned in the sense that the 2's complement sign bit (bit 15) is always false, voltage data stored in the RAM block 501 at the addressed location is applied to the "A" input of the magnitude comparator 712 inside the timing element 710. Clamped voltage measurement data from the zero clamp element 707 is applied over connection 708 to the "B" input of the magnitude comparator 712. In accordance with the operational characteristics of a SAR, the bit testing process continues until a match with the value of "A" just greater than the value of "B" is obtained. At this point, the address represents a digitally scaled current, which is within 1 least significant bit (LSB) of the ideal actual current for the measured voltage on connection 708 consistent with the I/V table presently stored in the RAM block 501.

The state machine 700 also comprises a loop compensation filter 730. The loop compensation filter 730 comprises a complement element 732, an adder 736, an infinite impulse response (IIR) lowpass filter 739 and a register 744. The output of register 744 is fed back to the port B read address port ADDRB of RAM block 504. The addressed location in the RAM block 504 contains the filter coefficient, which is provided over connection 726 to the B1 input of the IIR lowpass filter 739. The IIR lowpass filter 739 is a first-order digital lowpass filter.

A total of 128 different coefficients are available, one for each consecutive set of 32 I/V pairs stored in the I/V table. Computational algorithms used by table generating code executed in the mainframe microprocessor 112 (FIG. 2) take into account the slope of the current versus voltage function in each 32 I/V pair range, i.e. gain, and calculate filter coefficients consistent with loop stability for targeted operating points within that range.

When the system is in a steady-state condition, i.e. when repeated cycling of the table lookup state machine 320 accesses the same location in RAM block 501, the port B address ADDRB of RAM block 501 and the port B address ADDRB of RAM block 504 have identical values. When a steady-state condition does not exist, i.e. when the system is in transition from accessing one location (address) to another in RAM block 501, the port B address ADDRB of RAM block 504 will be different than the port B address ADDRB of RAM block 501 due to a low-pass filtering action applied by loop compensation filter 730 to the signal SAR[11:0] applied its ($Z^0$) input via connection 725.

Arranging the RAM blocks 501 and 504 as two distinct physical entities, as also shown in FIG. 5, 7 and FIG. 6A, is preferable because two different content values are obtained from a single address, i.e. one content value obtained from RAM block 501 at an address directly specified by the signal SAR[11:0] on connection 725 and the other content value obtained from RAM block 504 at an address derived from SAR[11:0] by filter 730. The first content value is the I/V pair voltage value to be compared to the measured output voltage $V_{RDBK}$ as part of the table look-up procedure that obtains the desired ideal current value (encoded as the table entry address). The second content value is the loop compensation filter coefficient, provided to the IIR lowpass filter 739, appropriate for the particular corresponding range of operating points on the solar array characteristic curve. It may also be seen that the overall method of defining I/V table RAM contents so that an address serves to implicitly represent the desired ideal current programming value associated with the voltage value stored at that address provides a particularly efficient means for encoding I/V pair information. Simultaneous use of the address to derive access to a filter coefficient stored in a look-up table in a physically distinct RAM structure further enhances the compactness and access efficiency for data structures used by the DSP state machine 700 that implements the voltage input, current output power supply algorithm.

The IIR lowpass filter 739 receives the coefficient value over connection 726 and receives the SAR[11:0] as a function x(n) over connection 725 to the ($Z^0$) input. The function x(n) represents a digitally scaled ideal current value consistent with the stored I/V table. The B1 coefficient value on connection 726 is complemented in the complement element 732 and the value "one" is digitally added by the adder 736 to the complement value on connection 738 to provide the A0 coefficient input to the IIR lowpass filter 739 over connection 741. With proper scaling in subsequent computational stages, this operation is equivalent to subtracting the B1 coefficient from a value of unity to derive the A0 value and serves to ensure that the gain of the IIR lowpass filter 739 at DC is exactly equal to one. Deriving the A0 coefficient in this manner also minimizes demand for RAM storage and, more importantly, shortens the time required for computation and transmission of values calculated by the mainframe microprocessor 112 (FIG. 2).

Hardware multipliers (not shown) and an adder (not shown) within the IIR lowpass filter 739 provide a single-pole lowpass filtered output sample over connection 742 to a register 744 for the current input sample represented by the inputs. A timing strobe from the timing generator 716 over connection 747 is used to store the output sample in the register 744 for subsequent use by the error correction element 750 over connection 746. This sample is also used as the y(n−1) ($Z^{-1}$) input to the IIR lowpass filter 739 in the next sampling period, and is also provided as noted above as the ADDRB input to the RAM block 504 over connection 727. Operation of the IIR lowpass filter 739 is defined by the equation given below and should be well understood by those skilled in the art.

$$y[n]=a_0x[n]+b_1y[n-1]$$

The error correction element 750 includes a multiplier 752, an adder 754 and a register 756. This error correction element 750 provides digital correction for gain and offset errors in the current programming circuits. Errors in the current programming D/A, errors in the current sensing circuits and associated transducer (shunt), as well as errors associated with the analog current feedback loop summing amplifier embedded within the digital loop are corrected.

A similar, but somewhat smaller set of errors also exists in the voltage measurement circuit. These errors are corrected by computationally "pre-warping" the voltage values stored in the RAM block 501. The computation is done as part of the table generation process performed by the mainframe microprocessor and comprises another part of the manner in which data is stored in I/V RAM for subsequent use by the state machine 700. Overall performance is optimized by separating the two error correction processes and by using hardware to correct errors in the current programming path.

The output of the error correction element 750 on connection 392 is provided to the D/A converter 366. The multiplexer 360 (FIG. 3) is not shown in FIG. 7 for simplicity. The D/A converter 366 converts the digital value on connection 392 to an analog control signal that represents the desired current output for the power supply module 118. The system implements a voltage input, current output control loop, which constrains the output of the power amplifier module 118 to conform to a user specified I/V curve.

It has been demonstrated that very high speed operation is provided by the implementation described. In an embodiment, a 50 MHz basic clock results in a total computation time of 400 ns to execute one look-up operation on the I/V table. The voltage measurement A/D converter 701 provides samples every 2.5 μs. Summing these two delays yields a digital sampling period of approximately 2.9 μs. This short sampling time is available to the system as whole regardless of the number of channels present because each power supply module 118 has its own dedicated hardware processor for implementing the process just described. Improved response (bandwidth) to load changes is thereby provided. Moreover, readily available higher speed versions of both the A/D converter and the FPGA in which the hardware processor is implemented could easily provide sampling periods below 1 μs.

FIG. 8 is a graphical illustration of a portion 800 of an I/V characteristic table. The portion 800 includes an address column 802, a current value column 804 and a voltage column 806. As shown, each address location corresponds to a precise current programming value and a voltage value. In this manner, when the state machine 700 described above arrives at a particular address in the table, the address itself represents a digitally scaled current which is within 1 least significant bit (LSB) of the ideal actual current for the measured voltage on connection 708 consistent with the I/V table presently stored in the RAM block 501. Note that the current value column 804 is not part of tables actually stored in RAM block 501, but is provided in FIG. 8 as an aid to understanding the relationship between table addresses and corresponding current programming values.

FIG. 9 is a schematic diagram illustrating an exemplary backplane address generator which is included with the backplane interface state machine 310 shown in FIG. 3. The circuitry in FIG. 9 shows example circuitry that can be used to control address access at port A of RAM block 501 and, further, demonstrates a method by which the programming resolution of the I/V table may be altered to further improve table update rates by trading off programming resolution for improvements in update speed. If, for example, 8-bit rather than 12-bit current programming is considered acceptable, then the I/V table may be shortened from 4096 to 256 words. The size of the RAM blocks 501 used for I/V table storage may simply be made smaller and the SAR 714 shortened to 8-bits if operation with lower resolution is desired by applying a control input, referred to as 8_BIT_MODE, on connection 901 to the SAR 714. The 128 word coefficient table remains the same size because the reduced resolution I/V characteristic curve still includes the full range of slopes and thus gains that must be accounted for when compensating the digital loop. If operation at both resolutions is desired, the change to 8-bit mode may be more effectively accomplished by loading I/V pairs into every 16$^{th}$ location in memory and by "short-cycling" the SAR 714 process to stop after an 8-bit address is obtained. In such an embodiment, significantly shortened table calculation and transmission times between the mainframe microprocessor 112 and the power supply module 118 are obtained by reducing resolution from 12-bits to 8-bits.

Operation in 8-bit mode, also described herein as fast or high speed mode, from voltage measurement data written to every 16$^{th}$ location implies modifications to the address generator to facilitate continued availability of a seamless address range when data is transferred from the mainframe microprocessor 112 (FIG. 2) to power supply module RAM (FIG. 2).

A binary counter 900 provides for automatically incremented and contiguous addressing for I/V (RAM block 501) and coefficient RAM (504) in both 12-bit and 8-bit modes. In an embodiment, the binary counter 900 is thirteen bits in length and comprises three cascaded 4-bit loadable binary counters 912, 916 and 918 followed by a 1-bit counter 922. Gating applied to the count enable (CE) inputs to the first two 4-bit stages 912 and 916 achieves the desired objectives of auto-incrementing and contiguous addressing regardless of whether the overall operating mode is 12-bit (high resolution mode) or 8-bit (high speed mode). It should be noted that operation in high resolution mode implies that all gating can be eliminated with a thirteen bit cascade established by connections between preceding terminal count (TC) outputs 926, 928 and 932 to later stage count enable inputs (CE). If writes to every 16$^{th}$ address in a 4K I/V RAM block 501 are desired for high speed mode, however, then the added gating through the stages 912 and 916 and hence to 918 is implemented.

The binary counter 900 functions as follows in high speed (8-bit) mode. Assuming that the address is initially preset to zero, the signal ADDR[12] (connection 512 in FIG. 5), which functions to select the coefficient RAM block 504, is set low. With the signal ADDR[12] in a low state, the presence of control input 8_BIT_MODE on connection 901 and COUNT_ENB on connection 906 in high states provides, via AND logic 902 and OR logic 914, a high state to the count enable (CE) input of the second 4-bit counter stage 916. Conversely, the presence of control input 8_BIT_MODE in a high state and the signal ADDR[12] in a low state provides, via AND logic 904, a low state to one input of AND logic 908, thus inhibiting counting in the first 4-bit counter stage 912 regardless of the state of COUNT_ENB. COUNT_ENB is periodically set to a high state (at a convenient time during a data transmission packet) for one clock period to enable address increments. With the conditions just described, incrementing occurs in the second 4-bit stage 916, thus incrementing the overall address (ADDR[12:0] in steps of 16 counts. Once a count of 4096 is reached, the signal ADDR[12] on connection 924 changes to a high state and the logic implemented by AND logic 902 and 904, and by OR logic 914, changes so that a high state of signal COUNT_ENB on connection 906 enables counting in the first 4-bit counter stage 912, while inhibiting counting in the second 4-bit counter stage 916 except when carry outputs from the first stage 912, via the signal TC on connection 926 are true. The address is incremented in steps of one count for ADDR[12:0] taken as a whole. The desired outcome of incrementing addresses to access every 16$^{th}$ location in the first 4K of I/V RAM with automatic and contiguous switching to increments to address every location in the next 128 words in coefficient RAM is therefore achieved.

If the control input signal 8_BIT_MODE on connection 901 is kept in a low state, AND logic 902 and 904 ensures that counting is always enabled in the first 4-bit counter stage 912 when the signal COUNT_ENB on connection 906 is in a high state but never enabled in the second 4-bit stage 916 except when the TC output signal on connection 926 of the first stage 912 is true. Addresses are therefore incremented to access every location with the entire 4K+128 word range for I/V RAM block 501 and coefficient RAM block 504. This is equivalent to functionality which would be achieved without AND logic 902, 904 and 908 and without OR logic 914 and thus suited to provide auto-incrementing and contiguous addressing for the high resolution (12-bit) mode.

The signals identified in FIG. 9 as ADDR[3:0], ADDR[7:4], ADDR[11:8], and ADDR[12] correspond directly to the signals shown in FIG. 5 at port A connections 506 and 512. Signals ADDR[11:0] directly address locations within RAM blocks 501 and 504 while ADDR[12] serves to select either RAM block 501 when in the low state or, alternatively, RAM block 504 when in the high state.

Still another refinement may be obtained because the mode change from 12-bit to 8-bit look-up can be accomplished by means of a single control bit. This allows for the possibility to include the control bit in a special control word transferred along with the I/V tables from the mainframe microprocessor 112 to the power supply module 118. Hardware processors in the power supply modules could then be designed to test the control bit to provide table-by-table on-the-fly changes between 12-bit and 8-bit operation. This capability then permits adaptive change from high precision (12-bit) mode to high-speed (8-bit) mode depending on the dwell time for successive tables. Put in terms of satellite operation, an adaptive capability of this type would allow for rapid table changes with some compromise in precision during eclipse transitions with high precision operation during full eclipse or full illumination. Since the system must have prior knowledge of dwell times, i.e. time between successive table changes, this mode would only work with dwell-paced lists of tables or, alternatively, with trigger-paced lists of tables wherein the triggering source has such prior knowledge of dwell times.

As shown in FIG. 8, the relationship between increasing current and decreasing voltage should be monotonic. As an example, the exponential model system of equations which may be used to define the characteristic I/V curve ensures this outcome. With the exponential model, certain other constraints, as described above, are placed on the selection of values for Isc, Imp, Vmp, and Voc. These constraints coincide with defining characteristic I/V curves that represent real solar arrays in actual use. An example of constraints on the selection of values for Isc, Imp, Vmp, and Voc include the following: Values should not be selected that cause points on the curve to fall below a straight line intersecting the current axis at Isc and the voltage axis at Voc. Further, Vmp and Voc should not be equal as this has the effect of defining infinite constant current (CC) mode gain in the constant voltage (CV) region of a characteristic curve. Equations used in models other than the exponential model may have different parameters and therefore different constraints. In all cases, however, changes in either the voltage or the current operating point on the I/V curve should be monotonically related to changes in the other characteristic, i.e. voltage to current or, conversely, current to voltage.

FIG. 8 shows a portion of an I/V characteristic table in the vicinity of the "knee" or maximum power point, as shown at point 12 of FIG. 1. The I/V characteristic curve is established using the parameters shown in FIG. 8. As noted previously, the column labeled CURRENT 804 is not present in the implementation described above (only positive voltage values in 16-bit 2's complement binary form are present at locations defined by ADDRESS), but is provided here to facilitate understanding. Full scale current is set to equal Isc for convenience of presentation in the figure as this sets each current value in the table equal to an exact binary-weighted fraction of Isc. In practice, full scale current would typically be set slightly above the highest anticipated Isc value. Returning to FIG. 8, the row 825 shows the result of a table look-up in high resolution (12-bit) mode given a measured voltage value of 60V. The SAR-based search finds a voltage value of 60.01V which is just above the target value of 60V. The associated current programming value of 7.699 A is within one 12-bit LSB of the ideal value of 7.7 A as defined by the equations used to build the table. Note that the value of 7.699 A is established by the gain of the system, which sets the programmed CC level to the address times the CC programming LSB weight, in this case 3941*1.954 mA. Establishing this value to greater precision using computation-intensive numerical techniques is unnecessary because the limits of precision in the current programming system are already achieved by the far more efficient search algorithm described above.

Rows 812, 814, 816 and 822 in FIG. 8 show table entries and thus possible search points for the high speed (8-bit) mode. These entries occur at every $16^{th}$ location as described above. For the same voltage reading of 60V, the SAR-selected address would be 3936, which corresponds to a current programming value of 7.689 A. The LSB weight with 8-bit programming resolution is 31 mA so the programmed value remains within one 8-bit LSB of the 7.7 A ideal value established by the equations used to define table entries.

Second, it should be noted that selection of the A>B output from the magnitude comparator 712 of FIG. 7 is dictated by the negative slope of the I/V curve. The algorithm could be made to work with curves having a positive slope by selecting the A<B output, but curves with positive slopes are outside the scope of SAS application.

Third, it was mentioned above that the table look-up process effectively inverts the closed form voltage as a function of current to provide a hardware-based numerical implementation for current as a function of voltage that is particularly efficient both in terms of hardware resources and execution time. Elaborating further, it should be noted also that a successive approximation register usually establishes or exploits a linear relationship between two variables, e.g. a SAR-based A/D converter provides a set of digital codes which are linearly related to an analog input voltage or current. For the state machine 700, the relationship is non-linear as may be seen by reference to FIG. 1. Use of a SAR to operate within a non-linear system illustrates another aspect of the invention described herein. When progressing through a linear range of current programming values, i.e. the table addresses, the stored voltage values change in a non-linear manner with respect to changes in the table address. For example, in the CC region 16 shown in FIG. 1, very small changes in current programming values correspond to very large changes in voltage. In the CV region 18 in FIG. 1; however, very large changes in current programming values result in relatively small changes in voltage. The table look-up state machine 320 reverses this relationship, but the non-linear relationship persists. Stated another way, in the CV region 18 small changes in voltage result in very large changes in the programmed current value, i.e., a significant fraction of the table is traversed even though the change from one voltage value to another is quite small. In the CC region 16; however, large changes in voltage correspond to relatively small changes in current. In this case, a small range of current is traversed in the table even though the change in measured voltage is quite large.

In another embodiment, the measurement and programming functions described above may be exchanged so that current measurements are substituted for voltage measurements and voltage programming is substituted for current programming. Referring momentarily to FIG. 3, the input to table lookup state machine 320 would now come from the signal $I_{RDBK}$ taken from the A/D converter 384 while the programming output of table lookup state machine 320 would be moved along with multiplexer 360 to the input of voltage programming D/A converter 354. Referring to FIG. 7, entries in RAM block 501 would comprise current values while the addresses of RAM block 501 would represent idealized voltage programming values associated with each I/V pair as matched against the measured output current by action of the SAR algorithm previously described. No fundamental change to the operational characteristics of table lookup state machine 320 is made although the loop filter corner frequencies might be adjusted to reflect the change from voltage input–current output control to current input–voltage output control.

In yet another embodiment, the techniques described herein can be used to implement a system that switches mode from CC to CV and vice versa as the operating point shifts between the CC and CV regions of the curve (see FIG. 1). As noted earlier, improved stability may be obtained in this manner with a possibility for simplifying or eliminating the previously described adaptive loop compensation filter 730. The computations carried out by the mainframe microprocessor 112 for generating table entries would entail the use of numerical techniques for the CV region if the exemplary exponential model is used. If a different mathematical model is used to obtain I/V pairs, it may be possible to directly calculate current in terms of voltage and well as voltage in terms of current. Some modifications to the control logic within table lookup state machine 320 would be used to implement automatic crossover from voltage input–current output mode in the CC region of the I/V characteristic curve to current input–voltage output mode in the CV region of the I/V characteristic curve.

In still other embodiments or applications, it is possible to have inputs of different power supply operating parameters, measurements of output power for example, with outputs directed towards control of any other parameter, for example either voltage or current, as deemed appropriate or necessary to meet specific application requirements. Identical or very similar processes for calculating table entries relating a controlled parameter to a controlling parameter, for transferring these tables into module RAM memory, and for subsequent execution of the tables by the table lookup state machine 320 are possible.

Figure 10:
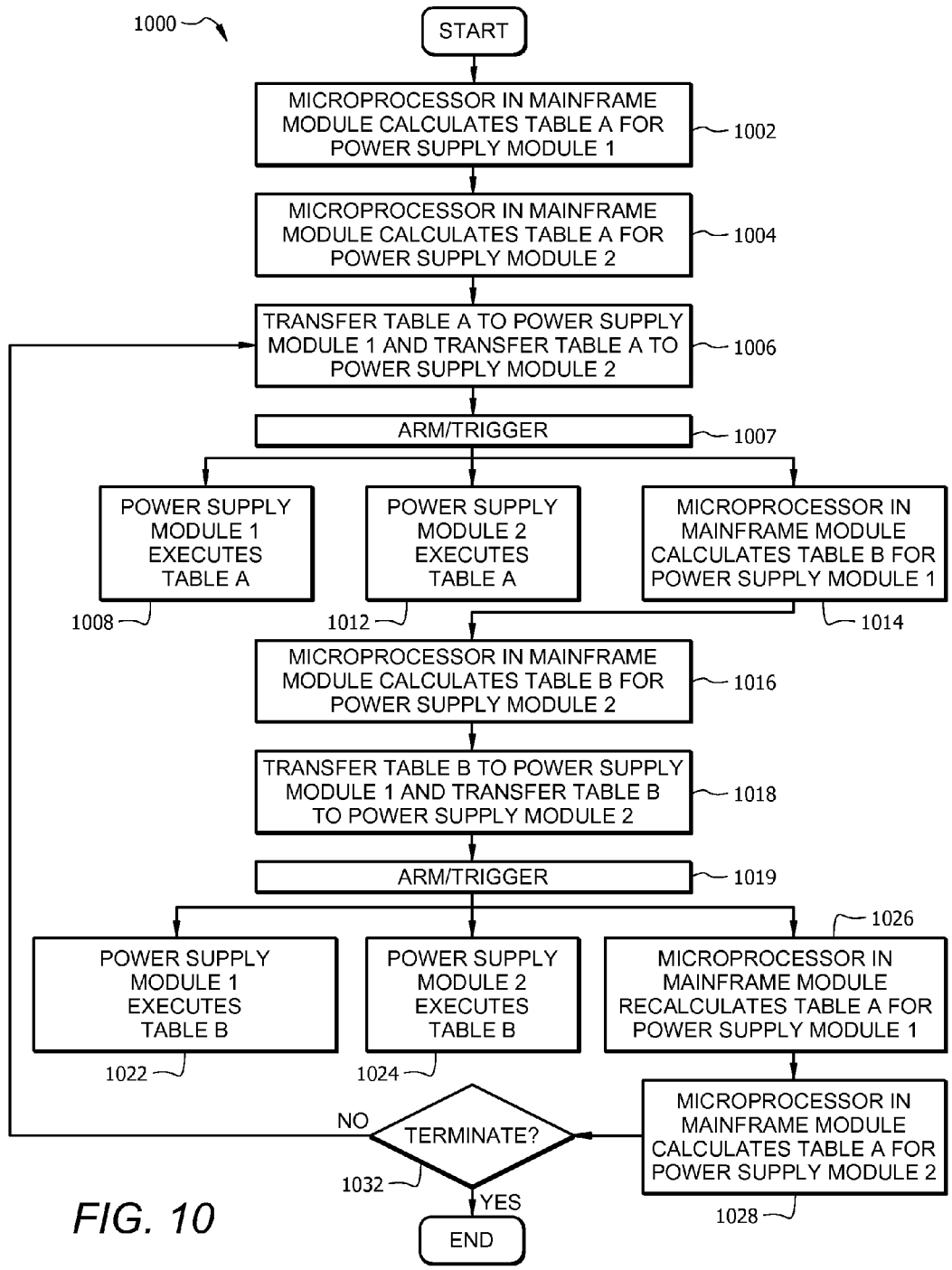
FIG. 10 is a flowchart showing the operation of an embodiment of a method for improving dynamic response in a power supply.

FIG. 10 is a flowchart showing the operation of an embodiment of a method for improving dynamic response in a power supply. In block 1002, the mainframe microprocessor 112 calculates I/V table A for the power supply module 118. In block 1004, the mainframe microprocessor 112 calculates IV table A for the power supply module 122. As stated above, both of the tables A mentioned here and tables B mentioned below, may be identical, identical but different in phase, or entirely different. In block 1006, the mainframe processor 112 (FIG. 2) accesses port A of the RAM 500 in power supply modules 118 and 122 and simultaneously transfers the two tables A to both power supply module 118 and power supply module 122. In block 1007, the mainframe microprocessor 112 initiates table execution in the power supply modules by transmitting an arming command to both power supply modules, and by providing a trigger signal to both power supply modules.

In block 1008, the power supply module 118 executes its table A in accordance with the lookup table state machine 320 described above. Simultaneously, in block 1012, the power supply module 122 executes its table A also in accordance with the lookup table state machine 320 described above. Simultaneously with the execution of the tables A in both power supply modules 118 and 122, in block 1014, the mainframe microprocessor 112 calculates a table B for power supply module 118, and, in block 1016, the mainframe microprocessor 112 calculates a table B for the power supply module 122.

In block 1018, the mainframe processor 112 again accesses port A of the RAM 500 in both power supply modules and then simultaneously transfers the tables B to each power supply module. In block 1019, the mainframe microprocessor 112 initiates table execution in the power supply modules by transmitting an arming command to the power supply modules, and by providing a trigger signal to both power supply modules.

In block 1022, the power supply module 118 executes its table B in accordance with the lookup table state machine 320 described above. Simultaneously, in block 1024, the power supply module 122 executes its table B in accordance with the lookup table state machine 320 described above. Simultaneously with the execution of the tables B in both power supply modules 118 and 122, in block 1026, the mainframe microprocessor 112 recalculates a revised table A for power supply module 118, and, in block 1028, the mainframe microprocessor 112 recalculates a revised table A for the power supply module 122.

This process repeats until a termination signal is determined to be received by the mainframe processor in block 1032.

Figure 11:
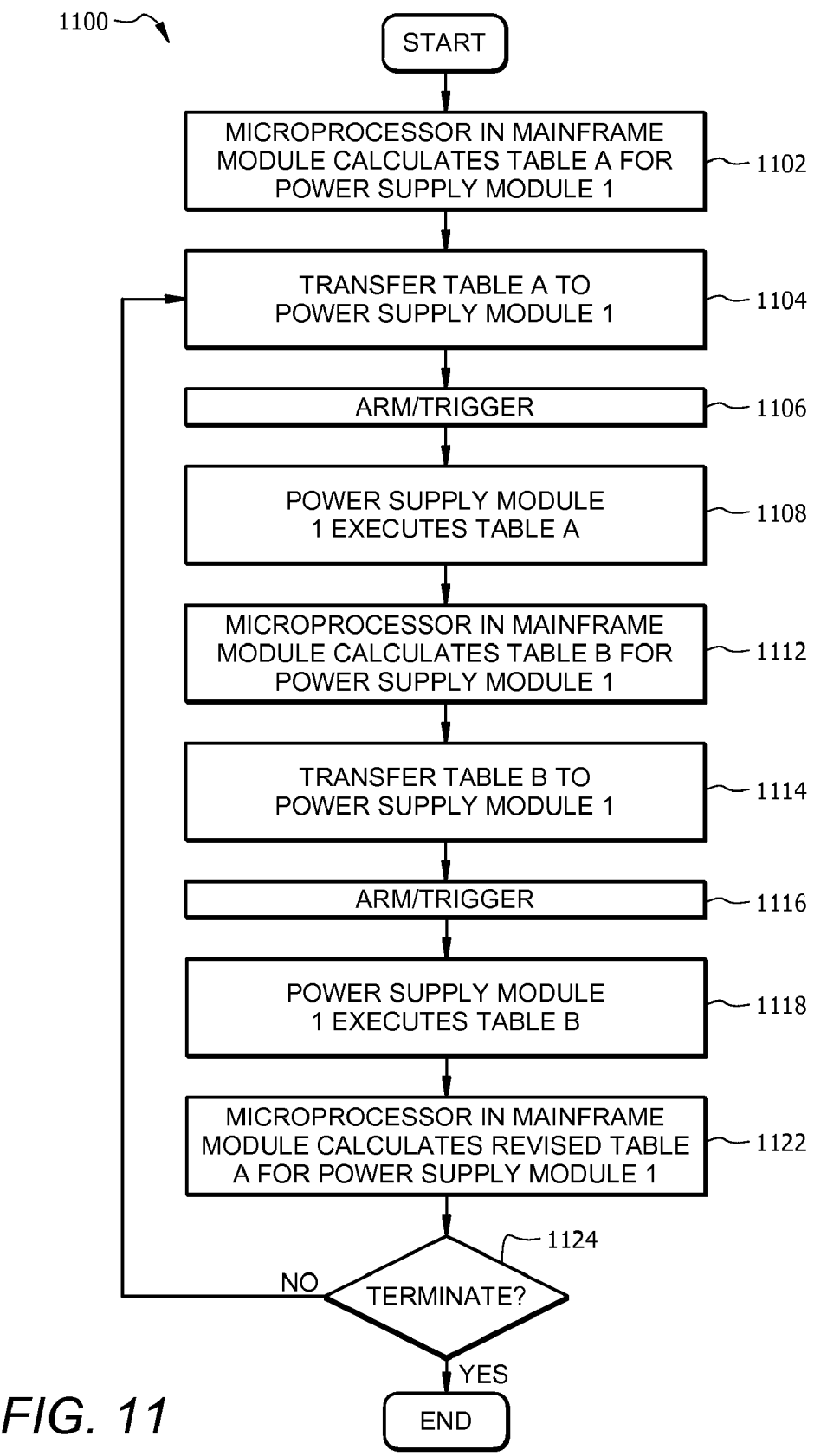
FIG. 11 is a flowchart showing the operation of an alternative embodiment of a method for improving dynamic response in a power supply.

FIG. 11 is a flowchart showing the operation of an alternative embodiment of a method for improving dynamic response in a power supply. In block 1102, the mainframe microprocessor 112 calculates I/V table A for the power supply module 118. In block 1104, the mainframe processor 112 (FIG. 2) accesses port A of the RAM 500 in power supply module 118 and transfers the table A to the power supply module 118. In block 1106, the mainframe microprocessor 112 initiates table execution in the power supply module 118 by transmitting an arming command to the power supply module 118, and by providing a trigger signal to the power supply module 118.

In block 1108, the power supply module 118 executes its table A in accordance with the lookup table state machine 320 described above. Simultaneously with the execution of the table A in the power supply module 118 in block 1112, the mainframe microprocessor 112 calculates a table B for power supply module 118.

In block 1114, the mainframe processor 112 again accesses port A of the RAM 500 in the power supply module 118 and transfers the table B to the power supply module 118. In block 1116, the mainframe microprocessor 112 initiates table execution in the power supply module 118 by transmitting an arming command to the power supply module 118, and by providing a trigger signal to the power supply module 118.

In block 1118, the power supply module 118 executes its table B in accordance with the lookup table state machine 320 described above. Simultaneously with the execution of the table B in the power supply module 118, in block 1122, the mainframe microprocessor 112 recalculates a revised table A for power supply module 118.

This process repeats until a termination signal is determined to be received by the mainframe processor in block 1124.

The foregoing detailed description has been given for understanding exemplary implementations of the invention and no unnecessary limitations should be understood there-from as modifications will be obvious to those skilled in the art without departing from the scope of the appended claims and their equivalents.

What is claimed is:

1. A system for improving dynamic response in a power supply, comprising:
   a mainframe module having a memory and a mainframe microprocessor, the mainframe processor configured to calculate a plurality of tables in which each table represents a current/voltage (I/V) characteristic curve for the power supply;
   at least two power supply modules coupled to the mainframe module, each power supply module having a random access memory element, the random access memory element configured to receive and store a first table and a second table;
   wherein the mainframe microprocessor transfers the first table to each power supply module, and wherein each power supply module executes a respective first table while the mainframe processor calculates the second table for each power supply module and while the mainframe processor transfers the second table to each power supply module.

2. The system of claim 1, in which the random access memory element comprises a dual-port structure, wherein a first port is configured to receive the first table and wherein a second port is configured to execute the first table while the first port is receiving the second table.

3. The system of claim 2, in which the random access memory element further comprises an additional memory block configured to store at least one filter coefficient.

4. The system of claim 3, further comprising:
   a timing element having a magnitude comparator configured to receive an output voltage signal that is representative of the voltage output of at least one of the power supply modules and configured to receive a table voltage value that corresponds to voltage data stored in the random access memory element at an address location identified by a successive approximation register;
   the magnitude comparator configured to compare the output voltage signal with the table voltage value to determine a point at which the table voltage value just exceeds the output voltage signal; and
   wherein the address location represents a scaled current value that corresponds to the output voltage signal.

5. The system of claim 4, further comprising a lowpass filter configured to receive the filter coefficient from the additional memory block, in which the filter coefficient is obtained from the address location.

6. The system of claim 5, in which the first table and the second table comprise 4096 address locations each having a table voltage value.

7. The system of claim 5, in which the first table and the second table comprise 256 address locations each having a table voltage value.

8. A method for improving dynamic response in a power supply, comprising:
   calculating a first table for each of at least two power supply modules, in which each first table represents a current/voltage (I/V) characteristic curve for the power supply;
   transferring the first table to the at least two power supply modules;
   executing the first table in each of the at least two power supply modules;
   simultaneously with the execution of the first table in each of the at least two power supply modules, calculating a second table for each of the at least two power supply modules;
   simultaneously with the execution of the first table in each of the at least two power supply modules, transferring the second table to the at least two power supply modules;
   executing the second table in each of the at least two power supply modules; and
   simultaneously with the execution of the second table in each of the at least two power supply modules, calculating a revised first table for each of the at least two power supply modules.

9. The method of claim 8, in which transferring the first and second tables further comprises transferring the first and second tables to a first port of a dual-port random access memory element.

10. The method of claim 9, in which executing the first and second tables further comprises executing the first and second tables from a second port of the dual-port random access memory element.

11. The method of claim 10, in which the random access memory element further comprises an additional memory block configured to store at least one filter coefficient.

12. The method of claim 11, further comprising:
    receiving in a timing element an output voltage signal that is representative of the voltage output of at least one of the power supply modules;
    receiving in the timing element a table voltage value that corresponds to voltage data stored in the random access memory element at an address location identified by a successive approximation register; and
    comparing the output voltage signal with the table voltage value to determine a point at which the table voltage value just exceeds the output voltage signal, wherein the address location represents a scaled current value that corresponds to the output voltage signal.

13. The method of claim 12, further comprising:
    receiving in a lowpass filter the filter coefficient from the additional memory block, in which the filter coefficient is obtained from the address location.

14. The method of claim 13, in which the first table and the second table comprise 4096 address locations each having a table voltage value.

15. The method of claim 13, in which in which the first table and the second table comprise 256 address locations each having a table voltage value.

16. A system for improving dynamic response in a power supply, comprising:
    a mainframe module having a memory and a mainframe microprocessor, the mainframe processor configured to calculate a plurality of tables in which each table represents a current/voltage (I/V) characteristic curve for the power supply;
    at least one power supply module coupled to the mainframe module, the power supply module having a random access memory element, the random access memory element configured to receive and store a first table and a second table;
    wherein the mainframe microprocessor transfers the first table to the power supply module, and wherein the power supply module executes the first table while the mainframe processor calculates the second table for the power supply module and while the mainframe processor transfers the second table to the power supply module.

17. The system of claim 16, in which the random access memory element comprises a dual-port structure, wherein a first port is configured to receive the first table and wherein a second port is configured to execute the second table while the first port is receiving an updated first table.

18. The system of claim 17, in which the random access memory element further comprises an additional memory block configured to store at least one filter coefficient.

19. The system of claim 18, further comprising:
- a timing element having a magnitude comparator configured to receive an output voltage signal that is representative of the voltage output of the at least one of the power supply module and configured to receive a table voltage value that corresponds to voltage data stored in the random access memory element at an address location identified by a successive approximation register;
- the magnitude comparator configured to compare the output voltage signal with the table voltage value to determine a point at which the table voltage value just exceeds the output voltage signal; and
- wherein the address location represents a scaled current value that corresponds to the output voltage signal.

20. The system of claim 19, further comprising a lowpass filter configured to receive the filter coefficient from the additional memory block, in which the filter coefficient is obtained from the address location.

21. The system of claim 19, further comprising a successive approximation register configured to determine the address location, where the address location has a non-linear relationship with the output voltage value.

* * * * *